(12) United States Patent
Elsheemy

(10) Patent No.: US 10,431,080 B2
(45) Date of Patent: Oct. 1, 2019

(54) SYSTEM FOR LOCATIONS SURVEILLANCE BY REMOTELY LOGGING SURVEILLANCE DATA TRANSMITTED BY VEHICLES

(71) Applicant: Mohamed Roshdy Elsheemy, Akron, OH (US)

(72) Inventor: Mohamed Roshdy Elsheemy, Akron, OH (US)

( * ) Notice: Subject to any disclaimer, the term of this patent is extended or adjusted under 35 U.S.C. 154(b) by 0 days.

(21) Appl. No.: 15/999,882

(22) Filed: Aug. 29, 2018

(65) Prior Publication Data

US 2019/0066494 A1 Feb. 28, 2019

Related U.S. Application Data

(62) Division of application No. 14/544,801, filed on Feb. 20, 2015, now Pat. No. 10,121,370.

(51) Int. Cl.

| | |
|---|---|
| *G08G 1/07* | (2006.01) |
| *G08G 1/087* | (2006.01) |
| *G01C 21/36* | (2006.01) |
| *B60R 25/00* | (2013.01) |
| *G08B 21/02* | (2006.01) |
| *G08G 1/005* | (2006.01) |
| *G08G 1/01* | (2006.01) |
| *G08G 1/017* | (2006.01) |
| *G08G 1/08* | (2006.01) |
| *G08G 1/0962* | (2006.01) |
| *G08G 1/0965* | (2006.01) |
| *G08G 1/0967* | (2006.01) |
| *G08G 1/052* | (2006.01) |
| *G01S 13/92* | (2006.01) |

(52) U.S. Cl.
CPC .......... *G08G 1/087* (2013.01); *B60R 25/00* (2013.01); *G01C 21/3691* (2013.01); *G08B 21/0202* (2013.01); *G08G 1/005* (2013.01); *G08G 1/012* (2013.01); *G08G 1/017* (2013.01); *G08G 1/0112* (2013.01); *G08G 1/0116* (2013.01); *G08G 1/0133* (2013.01); *G08G 1/0141* (2013.01); *G08G 1/052* (2013.01); *G08G 1/08* (2013.01); *G08G 1/0965* (2013.01); *G08G 1/09623* (2013.01); *G08G 1/09626* (2013.01); *G08G 1/096716* (2013.01); *G08G 1/096758* (2013.01); *G08G 1/096775* (2013.01); *G08G 1/096791* (2013.01); *G01S 13/92* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,317,311 | A | * | 5/1994 | Martell | G08G 1/01 340/901 |
| 5,555,036 | A | * | 9/1996 | Harnett | G01S 11/06 340/933 |
| 2004/0158436 | A1 | * | 8/2004 | Sinke | G06K 17/00 702/187 |

\* cited by examiner

*Primary Examiner* — Phung Nguyen

(57) ABSTRACT

A system for locations surveillance by remotely logging surveillance data transmitted by a vehicle when the vehicle's speed is under a threshold value while coming to a halt in close proximity to a surveillance data logger; the system comprising: a first in-vehicle apparatus on-board civilian vehicles; a second in-vehicle apparatus on-board law enforcement vehicles; a surveillance data logger installed at a location; wherein the surveillance data logger is configured to wirelessly communicate with the first in-vehicle apparatus to receive data associated with the vehicle.

6 Claims, 19 Drawing Sheets

S = SHORT RANGE SIGNAL
L = LONG RANGE SIGNAL
C = COMMANDS

SYSTEM FOR LOCATIONS SURVEILLANCE BY REMOTELY LOGGING SURVEILLANCE DATA TRANSMITTED BY VEHICLES

CROSS-REFERENCE TO RELATED APPLICATION(S)

The present application claims priority to U.S. application Ser. No. 14/544,801 filed on Feb. 20, 2015, entitled "Comprehensive traffic control system" which is currently U.S. Pat. No. 10,121,370 the entire disclosure of which are incorporated by reference herein, and is referred herein as ELSHEEMY. [The systems of high speed pursuits, radar, law enforcement safety, . . . etc of the U.S. application Ser. No. 14/544,801 are allowed for issuance].

FIELD OF THE INVENTION

The present invention relates to vehicles counting systems for designing road intersections, also relates to locations surveillance by remotely logging surveillance data transmitted by vehicles.

BACKGROUND AND SUMMARY OF THE INVENTION

As been described in ELSHEEMY, the present invention provides a system that utilizes radio signals and cellular network technologies along with GPS technology. The system consists of a number of electronic units, each one of these units performs a number of programmed functions to achieve a preferred overall operation of the system.

Some of these units include: THE POLICE VEHICLE UNIT, THE ORDINARY VEHICLE UNIT "VEHICLE UNIT", and THE LOGGING UNIT.

The Vehicle Unit

This unit uses a long range radio frequency transceiver module, preferably (1-2 mile) range, and a short range radio frequency transceiver module, preferably (0.1-0.2 mile range), along with a cellular-network circuit board, antenna, a thermal module and a GPS (Global Positioning System) receiver module. The circuit board is considered the brain component of the unit, it runs the entire system of the unit, the circuit board consist of a few computer chips. There are both digital-to-analog and analog-to-digital conversion computer chips within the circuit board. They convert audio signals going out from analog to digital, and then they convert the audio signals from digital back into analog.

The flash memory and ROM components of the unit circuit board serve as a storage location for the unit. They store the vehicle identification number "VIN" code, cell-phone codes, the GPS digital map application, the GPS readings; "coordinates, speed, heading and date/time", as well as the entire operating system.

The microprocessor is in charge of dealing with all the tasks that are to be performed by the unit. It also focuses on the unit's control signals (to and from the base station) and command options. It helps to interconnect all of the terminal display main functions.

The liquid crystal display (LCD) or the like, is a terminal display and connected to the unit through a Universal Serial Bus (USB) cable and comprises a number of Light Emitting Diode (LED) indicators, microphone, speaker, a camera and a number of buttons.

The vehicle unit is configured in a manner to disturb the vehicle "engine control unit" when the vehicle unit is being removed or tampered with. In another embodiment, the vehicle unit is integrated with the engine control unit to be more difficult to be removed.

The Police Unit

This unit comprises similar electronic components as the vehicle unit, but its terminal display is a touch screen interface and capable of displaying colored pictures. The police unit can communicate with the vehicle unit via the long range or the short range radio frequency, also the police unit can communicate with the vehicle unit via the cellular network.

Furthermore, the police unit stores the "control operating system" which is responsible for all the control commands needed to manipulate the vehicle unit. The police unit also stores the vehicle model, type and class category application.

The Logging Unit (Surveillance Data Logger)

This unit uses the short range (0.1-0.2 mile) radio frequency transceiver module to communicate with the vehicle unit, and comprises a memory to store the data transmitted by the vehicle unit. There are two types of logging units, the traffic logging unit for collecting data required for intersections design, and the security or monitoring logging unit "surveillance data logger" for collecting data about vehicles in a manner similar to surveillance cameras.

The Vehicle Model, Type and Class Category Application

Auto manufacturers worldwide produce variety of vehicles, which come in different sizes and body shapes each year, therefore each vehicle is defined by its make, model, body shape, year of built and its identification number.

All of these characteristics may be summarized in a unique code, which is called VEHICLE IDENTIFICATION NUMBER code (VIN).

A VIN code, is a unique code including a serial number, used by the automotive industry to identify individual motor vehicles, as defined in ISO 3833.

The vehicle descriptor section of the VIN code is used to identify the vehicle type, the model and the body style. While, vehicle identifier section of the VIN is used to identify the individual vehicle.

The present invention creates the vehicle type/model file by reading the VIN to determine the make and model of the vehicle and by having a set of pictures taken from different angles for each vehicle model and store them in a file, the vehicles in the file are arranged in a list of categories, each category contains the vehicles that share the same body shape and size. The pictures in this file can take any desired color to resemble the color of a target vehicle. The vehicle type/model file could be updated and uploaded into the police unit on predetermined dates.

Cellular Communication Codes

CELL-PHONE CODES: All cell phones have special codes associated with them. These codes are used to identify the phone. But in the present invention these codes will be transmitted from the police unit to the vehicle unit to give the vehicle unit a temporary ability to connect to the cellular network. Each one of the police vehicles is assigned a number of sets of "Cell-phone Codes or SIM card data" to enable the police vehicle unit to lend the vehicle unit the necessary codes that are required for cellular communication.

Electronic Serial Number (ESN): a unique 32-bit number programmed into the phone when it is manufactured. Mobile Identification Number (MIN): a 10-digit number derived from any phone's number. System Identification Code (SID): a unique 15-bit number that is assigned to each carrier by the Federal Communications Commission (FCC).

When someone powers up his cellphone, his cellphone looks for the System Identification Code (SID), on the cellphone control channel. And when the cellphone receives the SID, the phone compares it to the SID programmed into the phone. If the SIDs match, the phone knows that the cell it is communicating with is part of its home system.

Along with the SID, the phone also transmits a registration request, and the Mobile Telephone Switching Office (MTSO) keeps track of the phone's location in a database. This way, the MTSO knows which cell he is in when it wants to call his phone. Therefore, the records of where his cellphone is located give a pretty good idea of where he is. The cellphone carrier, for example (AT&T) stores these records in a database and this may raise serious privacy concern issues if a third party such as National Security Agency (NSA), or other authority agency gets hold of these records without a search warrant. Normally the cellphone carriers charge the cellphone owner monthly fees for the subscribed service.

Presently many vehicles' location registration systems utilize the cellular network technology to keep the vehicles' location continually recorded in a database, for monitoring, security purposes and traffic related matters. These systems require a permanent cellular subscribed service, which is very costly process when it deals with millions of vehicles, in addition to the violation of the vehicles' owners privacy.

The present invention creates an alternative method for, remotely, selectively and temporarily logging a motor vehicle to solve a specific matter, without compromising the privacy concerns of the innocent drivers. Also without the need for making them continually connected to the cellular network or paying for subscribed service.

The police vehicle unit communicates with the vehicle unit via a set of control commands to force it to execute a selected function or application.

The Police LCD Unit Interfaces

The police liquid crystal display (LCD) or the like, is a touch screen terminal display, it is connected to the police unit through a USB cable and comprises a number of LED indicators, microphone, speaker, a camera and a number of buttons. The display processor and software are responsible to interpret input from the touch-screen as commands. The police officer can access the control commands by either the touch screen input or by voice.

Voice recognition software designed to place each phoneme in a context based on the other phonemes in the software, which immediately picks up or registers from the police officer. The software program accomplishes this by running the phonemes through a statistical model based on mathematical computations called algorithms, and by comparing the phonemes with a library of command words, phrases and sentences it has stored. The voice recognition program then outputs the officer's words as text or executes the appropriate command. This way the police officer can comfortably use the police unit and focuses on driving his vehicle with a lot of concentration while driving in high speed. Thus, to achieve a high efficiency of the present invention.

The Vehicle LCD Unit

This terminal display may be either touch-screen or non touch-screen, its main job is to display the alert messages that transmitted by the police unit, or traffic logging unit, or in some cases to display alert messages related to the digital map. In some other embodiments the touch-screen display may be used for customized applications or programs such as some applications come with the cell phones.

Intersection Design

Intersection design can vary widely in terms of size, shape, number of travel lanes, and number of turn lanes. Basically, there are three types of at-grade intersections, determined by the number of intersecting legs, topography, traffic patterns, and the desired type of operation. Each roadway radiating from an intersection is called a "leg" Most intersections have four legs, which is generally accepted as the maximum recommended number for safety and capacity reasons. The three basic intersection types are: "T" intersection (three approach legs), Four-leg intersection, and Multi-leg intersection (five or more approach legs). The design for an intersection corner radius is based on the selection of a reasonable design vehicle for the specific location. Design vehicles can range from large (tractor-trailer combinations) to small vehicles. Therefore the need to determine the volume of traffic and the size of the vehicles which are crossing an intersection or making a right/left turning are vital for designing a safe and an efficient intersection.

The present invention provides a system and a method to determine the volume and the sizes of the vehicles to be used for intersections design. The traffic logging unit is responsible for collecting the traffic data needed for the intersection design. By assigning a traffic logging unit for each one of the intersection legs, the traffic logging unit will periodically send a traffic log command via the short range frequency, all vehicles traveling on each leg will transmit their VIN codes. And by collecting the data stored in each one of the traffic logging unit, we can determine the volume of traffic and the size of the vehicles that crossing and turning at an intersection. When the traffic logging unit sends the traffic log command, the yellow LED indicator will start flashing and a (COLLECTING TRAFFIC DATA) alert message will appear on the screen of the vehicle's display.

Security and Crime-Fighting System

Unlawful or forcible entry or attempted entry of a residence. This crime usually, but not always, involves theft. The illegal entry may be by force, such as breaking a window or slashing a screen, or may be without force by entering through an unlocked door or an open window. As long as the person entering has no legal right to be present in the structure a burglary has occurred. Furthermore, the structure need not be the house itself for a burglary to take place; illegal entry of a garage, shed, or any other structure on the premises also constitutes household burglary. If breaking and entering occurs in a hotel or vacation residence, it is still classified as a burglary for the household whose member or members were staying there at the time the entry occurred.

Violent crime includes murder, rape and sexual assault, robbery, and assault. Information about murder is obtained on a yearly basis from the FBI's Uniform Crime Reports. There are two measures for non-fatal violence—the Uniform Crime Reports (UCR) and the National Crime Victimization Survey (NCVS). NCVS measures rape or sexual assault, robbery, and aggravated and simple assault.

A motor vehicle, commonly referred to as a getaway car, is frequently used by the offender to flee the scene of a crime. Getaway cars are prevalent in major crimes such as bank robberies and homicides. Very frequently, but not always, a getaway car is stolen and is abandoned soon after the crime, in the hope that the vehicle cannot be traced to the offender.

If the vehicle does not belong to the driver and is quickly abandoned, a trace may not be possible without examination of forensic evidence. In some cases, the offender may go to extreme measures to discard the getaway vehicle in order to hide his 'tracks' by dumping it in a river or secluded park, and/or setting it on fire; while this may not make solving the crime impossible, it can make the effort more difficult for law enforcement. The criminal investigation can be further complicated by the use of multiple getaway vehicles, which can confuse eyewitnesses, as well as creating multiple places to investigate: each vehicle is a new crime scene. In Forensics for Dummies, the rookie is reminded: "At a minimum, the crime scene includes . . . Areas from which the site can be entered, exited, or even escaped.

Since a getaway vehicle often requires a getaway driver, this additional co-defendant creates problems in itself. First, having a second perpetrator involved creates yet another inchoate offense that the prosecutor can use in an indictment: conspiracy. Also, a co-conspirator may cooperate with police, either intentionally by 'turning state's evidence' by way of a plea bargain, or inadvertently by giving away information to persons outside the conspiracy. If the driver, who may have parked some distance away, unknowingly drives past the scene of the crime, the getaway vehicle itself may identify the occupants to the crime victim and police. This is especially true if the vehicle has unique markings or is an unusual model. Without a driver, the perpetrator may make errors due to the stress associated with the crime, or lack of ability to multi-task (such as leaving the car keys at the scene of the crime); a murderer needs to "think strategically" to get away with murder—to "mislead police, stage crime scenes and destroy evidence." Taking a public bus or taxicab makes the driver an involuntary co-conspirator, yet also creates an eyewitness whose interest it is to cooperate with police.

Witnesses to the crime will often attempt to take note of the tags (registration plate) or other important details of the car and report this information to law enforcement. It may be possible to identify the offender if an officer spots the offender in possession of the vehicle prior to its abandonment.

Thus, the present invention created a system and a method to help law enforcement identify the offenders in quick and efficient manners, by identifying the suspect vehicles that may be used by the offenders. Therefore, logging the vehicles that come nearby a spot logging unit and storing the logged data combined with real-time can grant the law enforcement instantly a quick access to the logged information from the crime scene logging unit. Prior systems generally rely on continuously logging the vehicles' locations in a central database, these database systems are similar to the database systems used by cellphone carriers. And when there is a need to obtain data relevant to a particular location 'crime scene', the law enforcement follows the legal protocol to obtain these vital records from the database carrier. The serious weakness of these systems is the wasting of the critical time just after the crime. A plenty of valuable time will be lost during the process of obtaining the logged records from the database carrier. Therefore, the offenders will have a good chance to abandon the getaway vehicle and may get rid of some important evidence. Also prior systems may violate the privacy rights of the vehicles' owners by having their movement continually monitored and stored in a central database for a long period of time. Thus, the present invention relies on individually owned spot logging units to be used for security and protection reasons (similar to the video cameras' purpose), to obtain an immediate access to the stored data, these individually owned spot logging units can be installed in homes, public parks, banks, schools, and commercial properties such as malls, gas stations, grocery stores, warehouses, parking lots, . . . etc.

Surveillance Data Logger

This unit uses the short range radio frequency transceiver module to communicate with the vehicle unit. And comprises a memory to store the data transmitted by the vehicle unit, also the memory stores the vehicles' make and model/type file.

Generally, vehicles drop their speed when they come to a halt, therefore the vehicle unit will transmit a logging signal when its speed goes under 15 MPH as a threshold value for example, via the short range signal to alert the surveillance data logger. And if there is any surveillance data logger in the range of the transmitted signal, the surveillance data logger will respond and send "spot log command" to the vehicle. The vehicle will reply by periodically transmit its VIN code combined with its location at real-time status, until the vehicle's speed goes to (zero). And when the vehicle's speed goes above (zero), the vehicle unit will resume transmitting its VIN code combined with its location at real-time. The vehicle will stop transmitting after its speed goes above 15 MPH. By obtaining the start time and the end time of logging we can determine the period of time the vehicle was at the scene. The memory chip or a removable memory card of the surveillance data logger store the logged data for a long period of time. Furthermore, the VIN codes of the vehicles are decoded into make and model/type to be displayed on the surveillance data logger display.

BRIEF DESCRIPTION OF THE DRAWINGS

The invention is herein described, by way of example only, with reference to the accompanying drawings, wherein:

FIG. 7 Also illustrates an example of a chased target vehicle being tracked on the digital map and displayed on the police LCD unit.

DETAILED DESCRIPTION OF THE INVENTION

Figure 1:
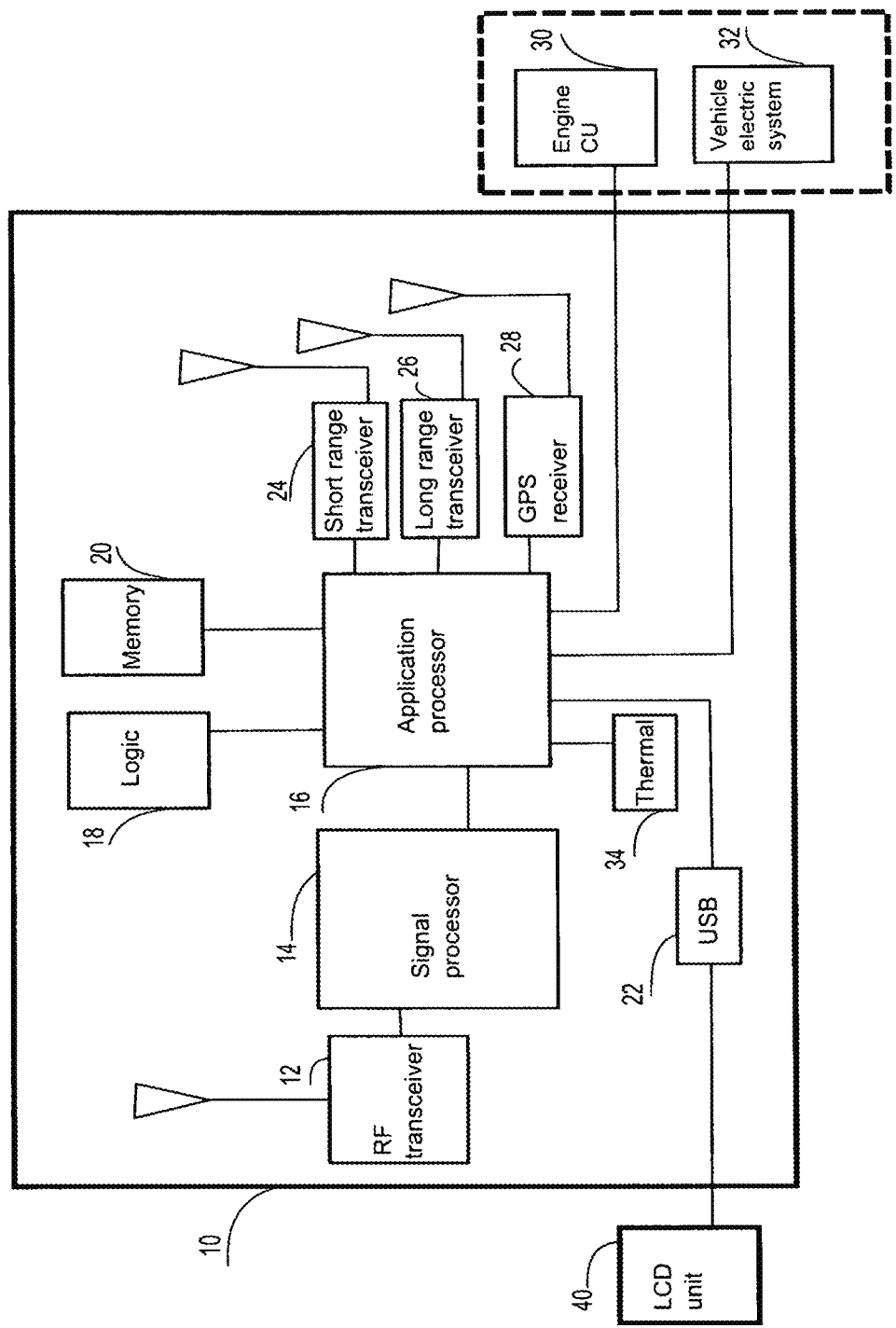
FIG. 1 Is a block diagram of the vehicle unit 10.
Figure 2:
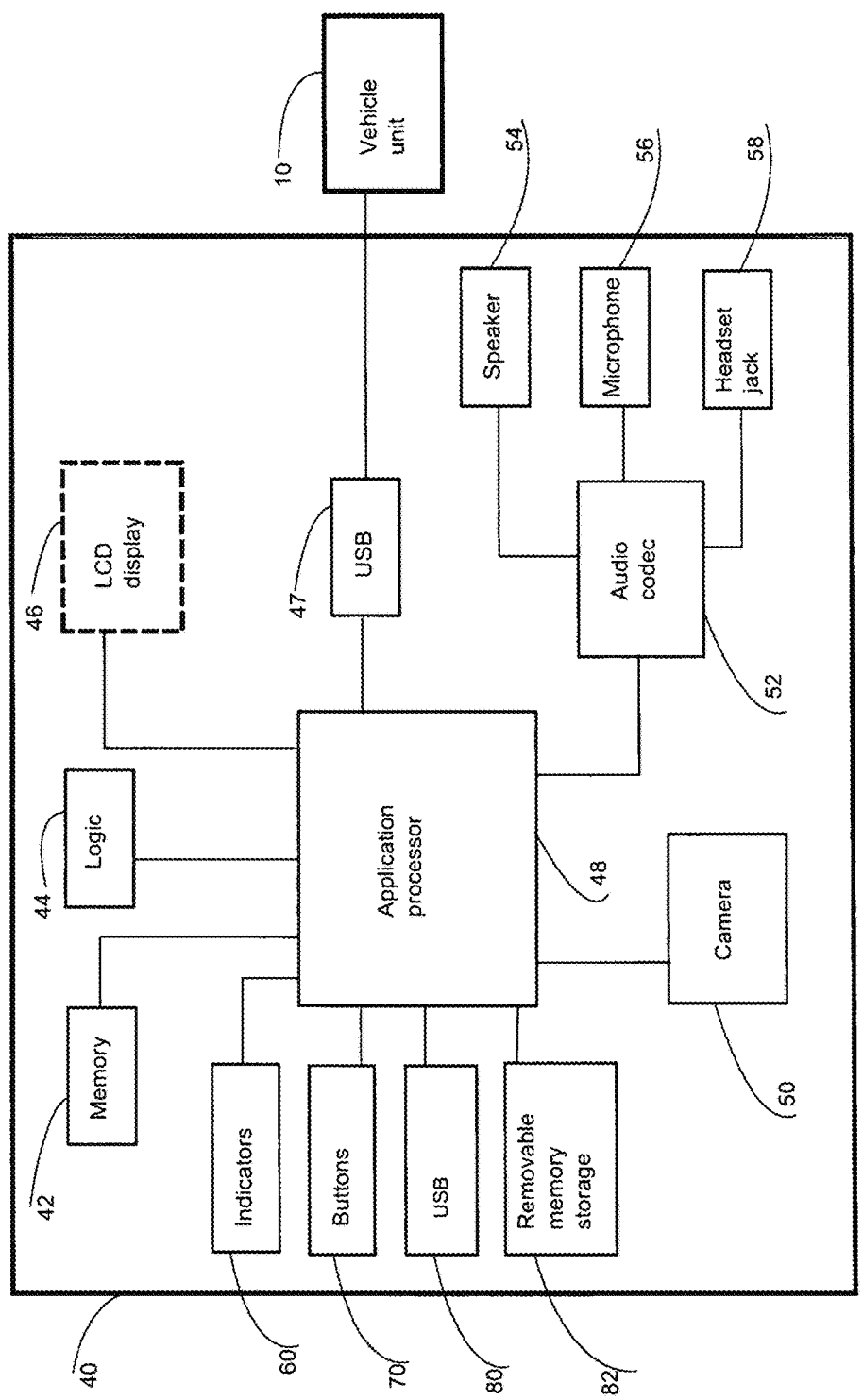
FIG. 2 Is a block diagram of the vehicle LCD unit 40, (the vehicle unit 10 and the LCD unit 40 will be referred as unit V10).

As shown in FIG. 1 and FIG. 2, the vehicle unit V10 installed in each new and used vehicle, and is powered by the vehicle's electric system 32. Vehicle unit 10 includes a RF transceiver 12, analog/digital signal processor 14, application processor 16, logic chips 18, memory chips 20, a USB port 22, a short range transceiver 24, a long range transceiver 26, and a GPS receiver module 28. Vehicle unit 10 is connected to the engine control unit (ECU) 30 in a manner to disturb the vehicle (ECU) when the vehicle unit V10 is being removed or tampered with.

There are both digital-to-analog and analog-to-digital conversion computer chips within the processor 14. They convert audio signals going out from analog to digital, and then they convert the audio signals from digital back into analog. The unit V10 is designed to connect to the cellular network and to communicate with the police vehicle unit P210 as well. The microprocessor 16 is in charge of dealing with most of the tasks that are to be performed by the unit V10. It also focuses on the unit's control signals (to and from the base station) and the control commands functions. It helps to interconnect all of the LCD unit 40 main functions. The memory 20 includes the flash memory and ROM components of the unit circuit board serve as a storage location for the unit. It stores the vehicle identification number "VIN" code, also the memory 20 temporary stores cellphone codes transmitted by the police vehicle unit P210 for a selected period of time, the memory 20 also stores the database of the GPS digital map application, the GPS readings for a period of time such as (the last 30 minutes of the vehicle movement), wherein these readings include "coordinates, speed, heading and date/time", also it stores the RFID active tag readings "tag number at real-time status", as well as the entire operating system.

The unit 10 uses a long range radio frequency transceiver module 26, preferably (1-2 mile) range, and a short range radio frequency transceiver module 24, preferably (0.1-0.2 mile range), a thermal module 34, and a GPS receiver module 28 to determine the location, heading, speed and date/time of the vehicle. The thermal module 34 is used for determining the temperature inside the vehicle.

Figure 3:
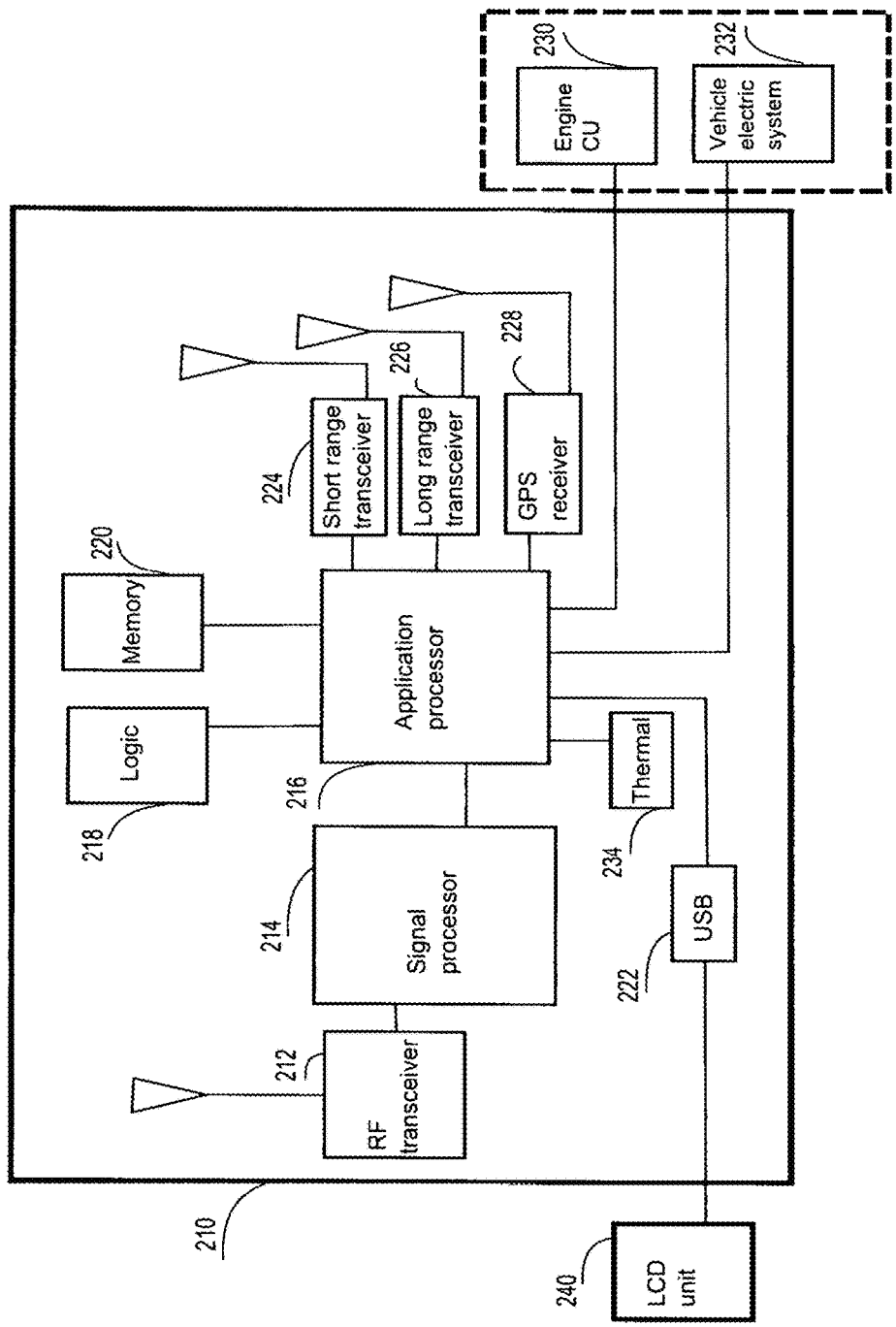
FIG. 3 Is a block diagram of the police vehicle unit 210.
Figure 4:
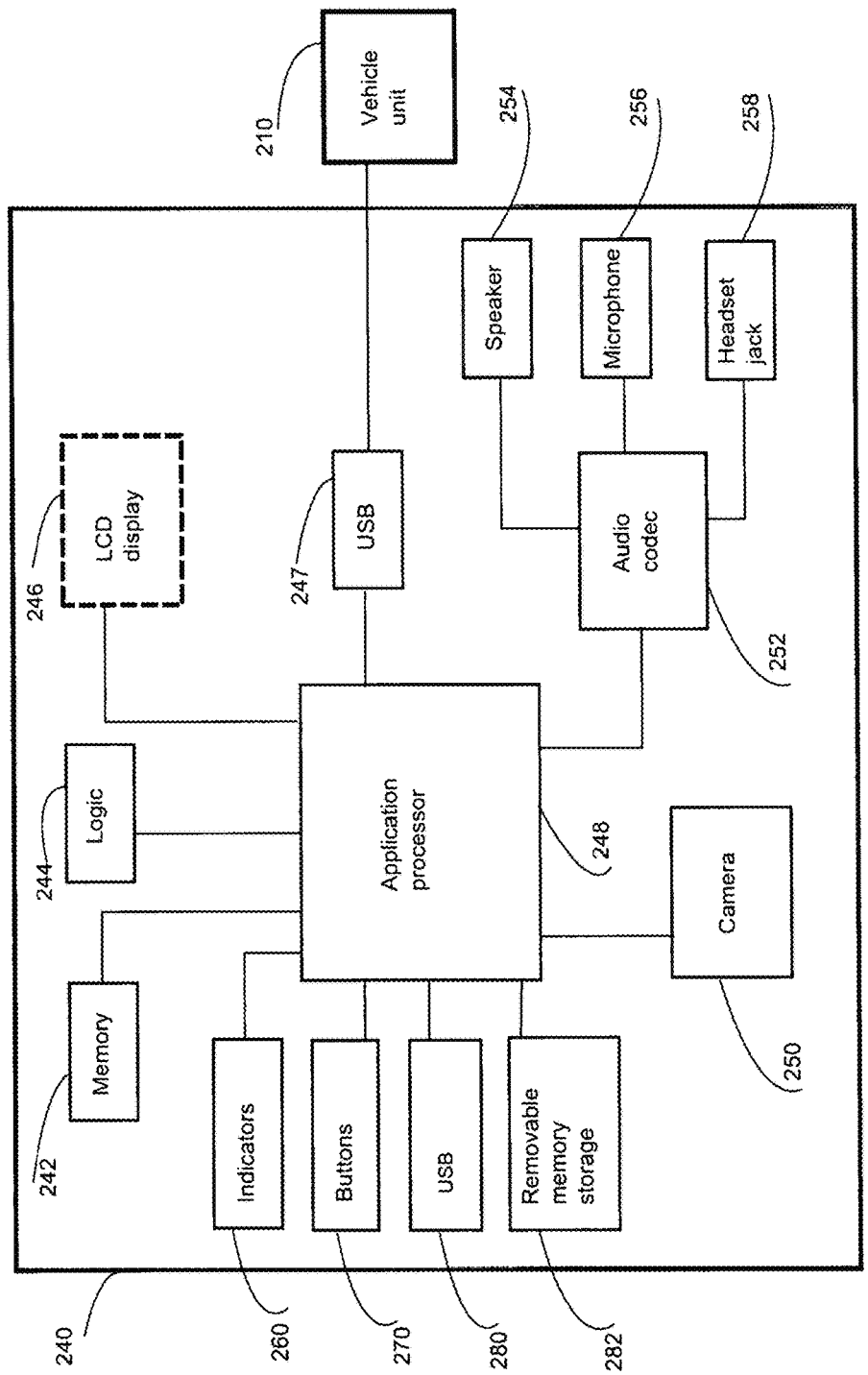
FIG. 4 Is a block diagram of the police vehicle LCD unit 240, (the police vehicle unit 210 and the LCD unit 240 will be referred as unit P210).
Figure 5:
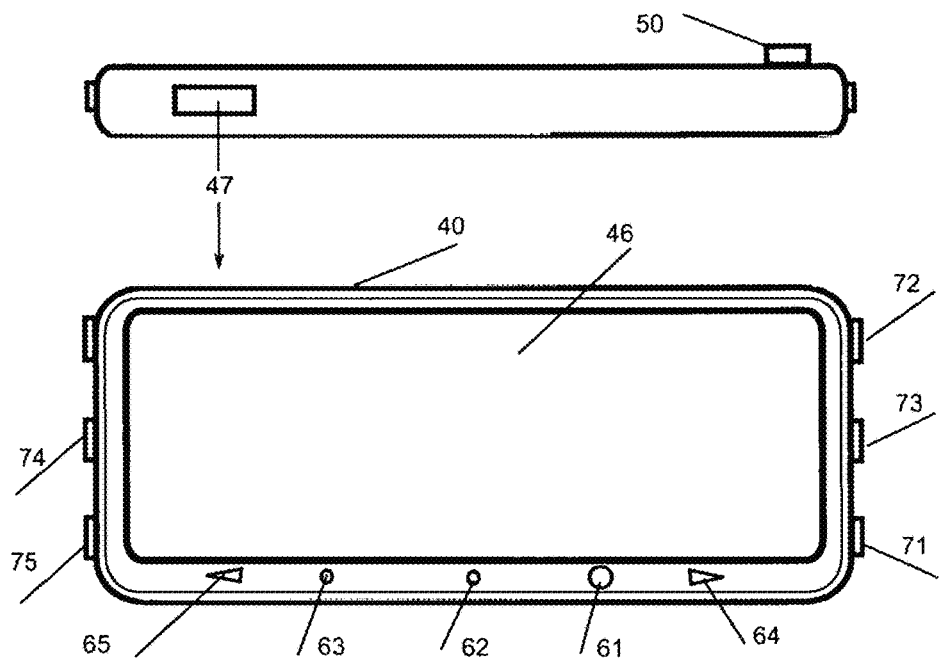
FIG. 5 Illustrates an example of the vehicle LCD unit 40 (front and top view).
Figure 6:
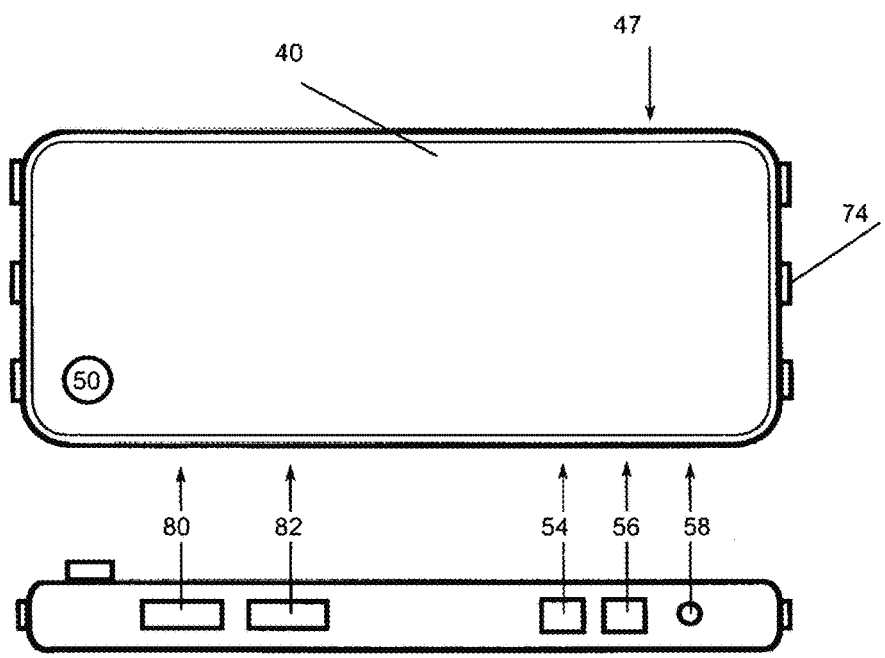
FIG. 6 Illustrates an example of the vehicle LCD unit 40 (rear and bottom view).
Figure 7:
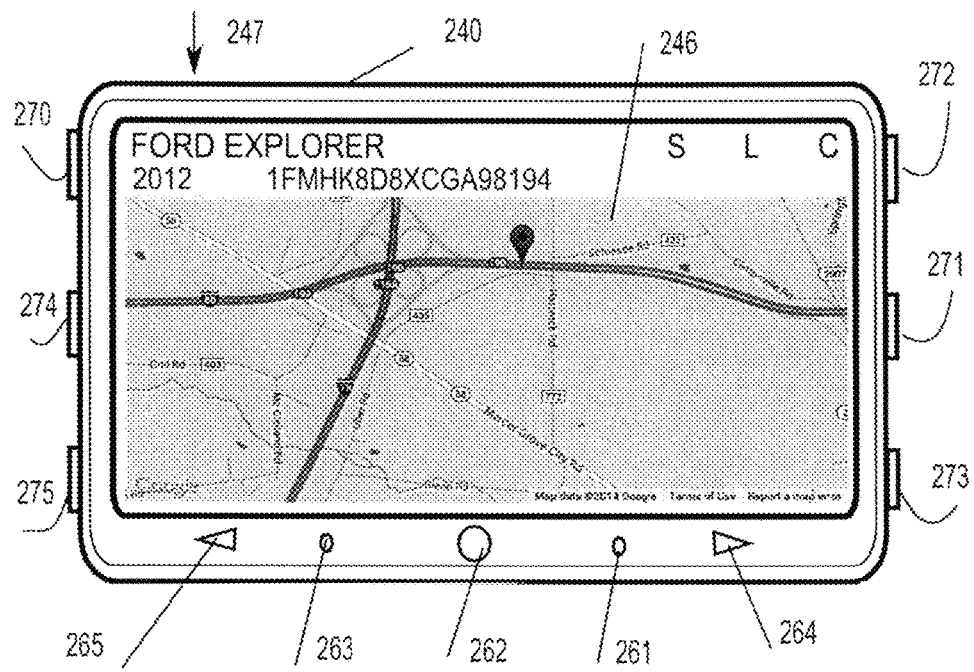
FIG. 7 Illustrates an example of the police vehicle LCD unit 240 (front view).
Figure 26:
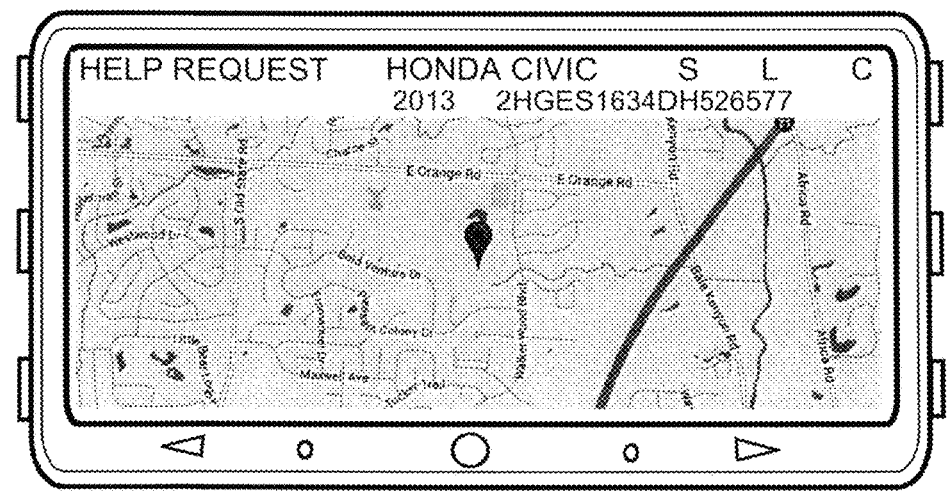
FIG. 26 Illustrates an example of a help request transmitted by a vehicle.
Figure 8:
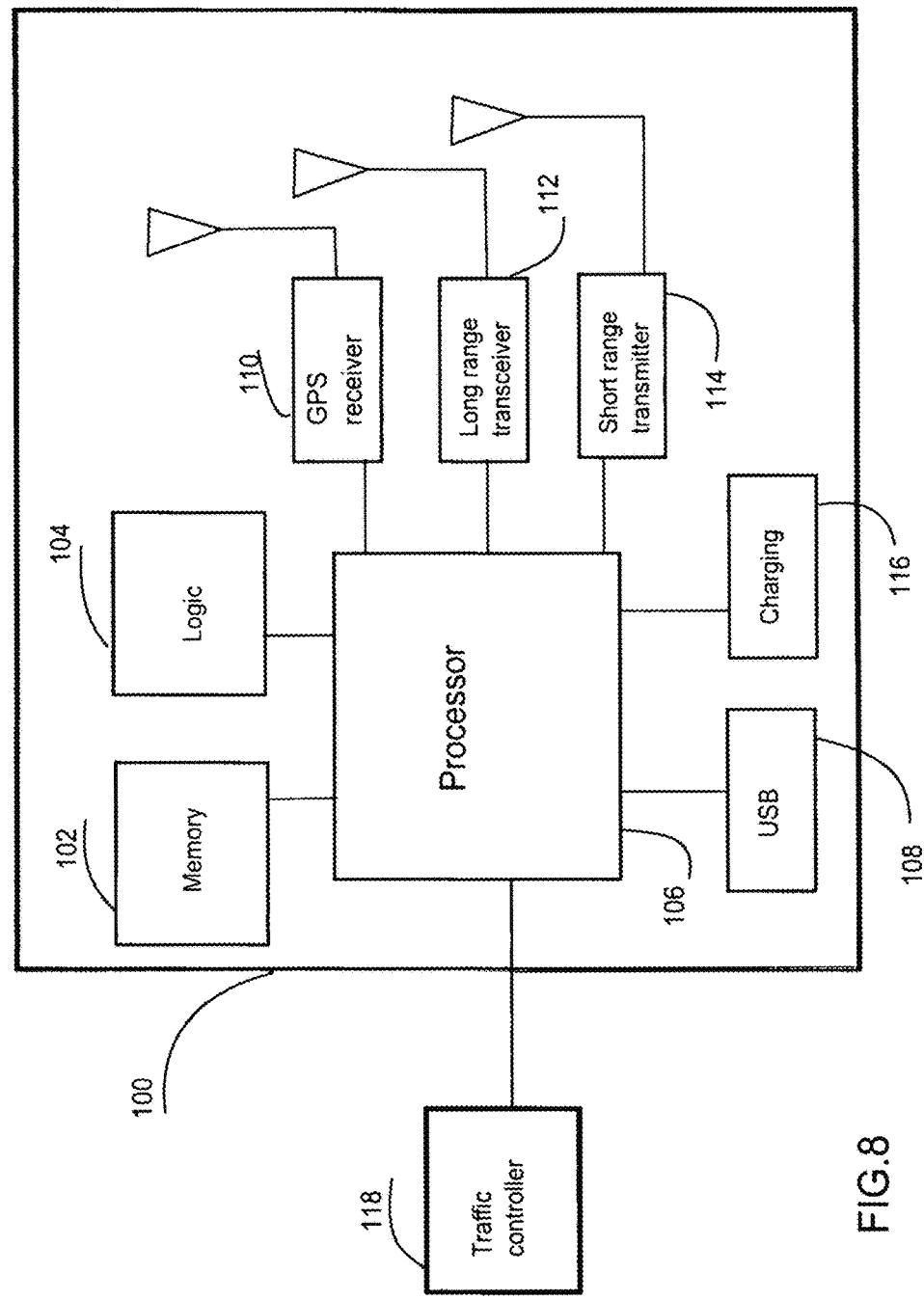
FIG. 8 Is a block diagram of the intersection unit 100.
Figure 9:
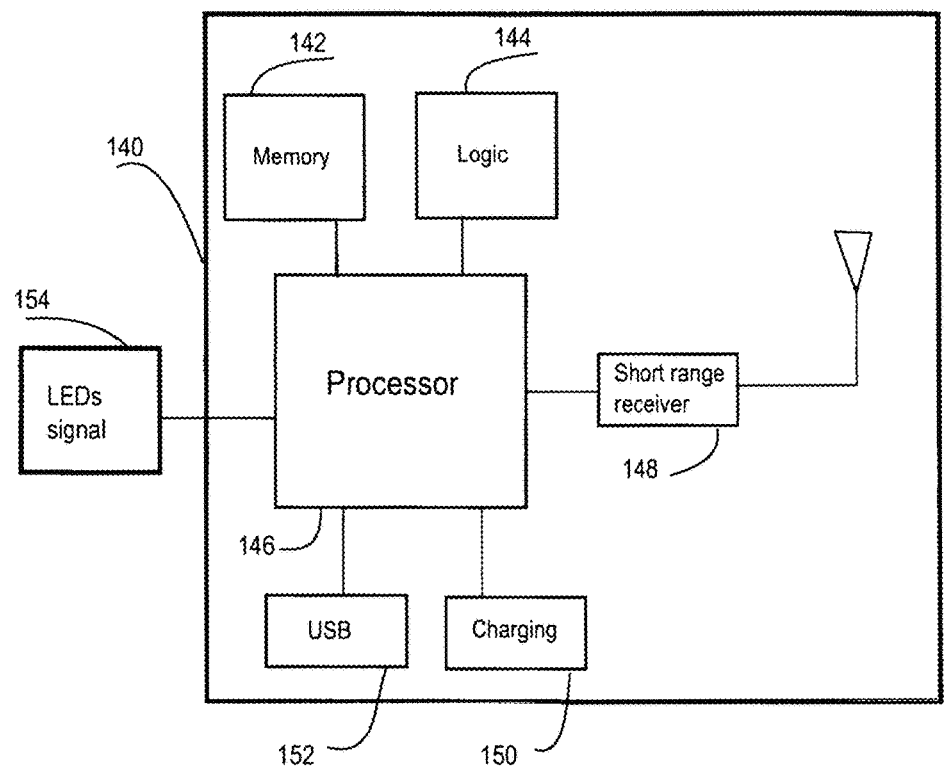
FIG. 9 Is a block diagram of the pedestrians unit 140.
Figure 10:
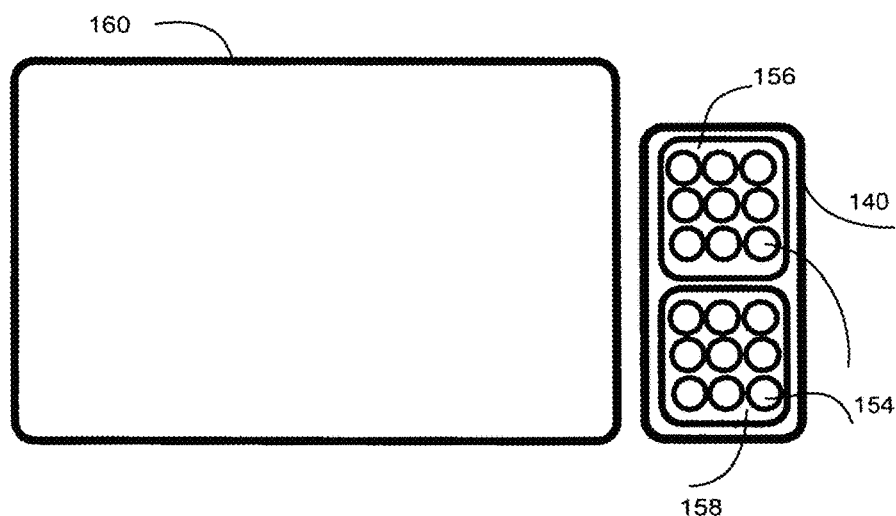
FIG. 10 Illustrates an example of the pedestrians unit 140 (front view).
Figure 11:
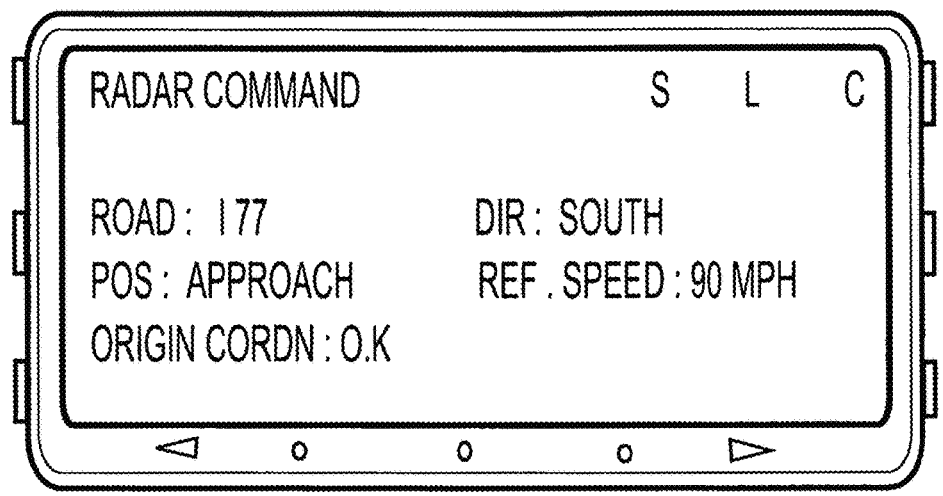
FIG. 11 Illustrates an example of the radar process. It shows the inputted parameters by the police to apply a radar command displayed on the police vehicle LCD unit.
Figure 12:
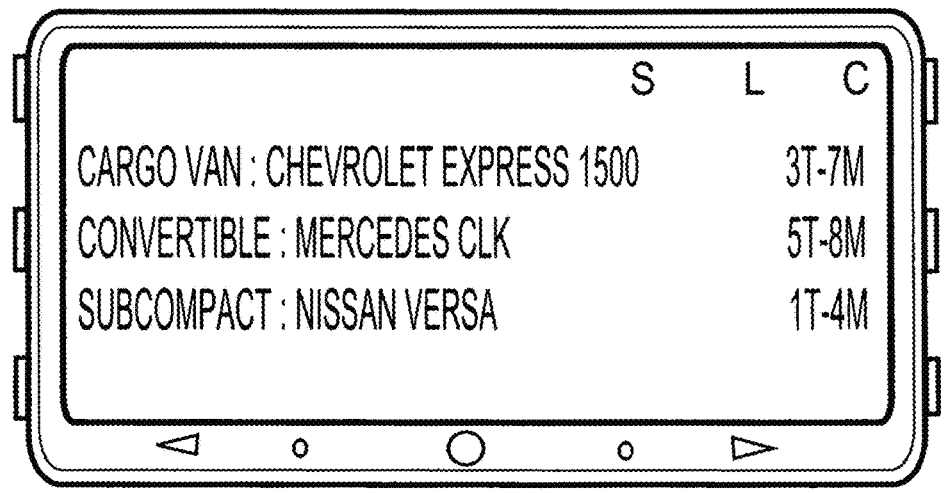
FIG. 12 Illustrates the list of the responding vehicles displayed on the police vehicle LCD unit.
Figure 13:
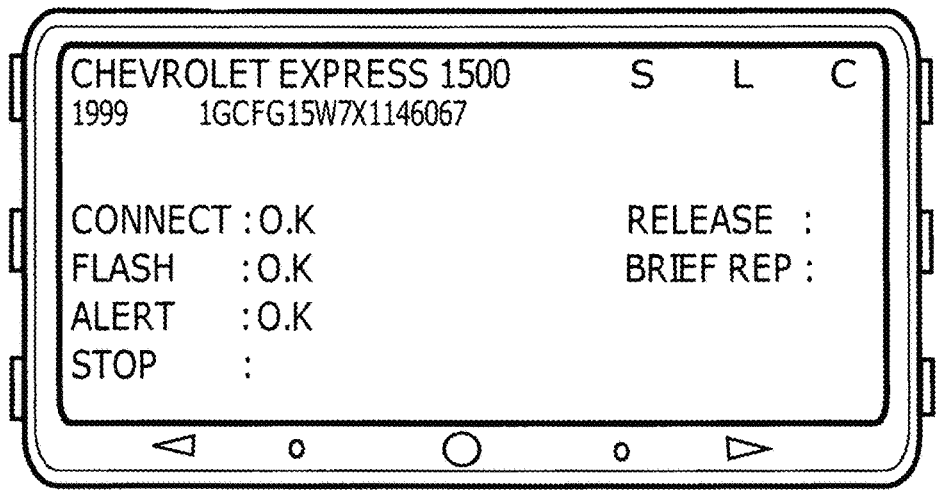
FIG. 13 Illustrates inputting (connect, flash and alert) commands to transmit them to the cited vehicle who displayed on the police vehicle LCD unit.
Figure 14:
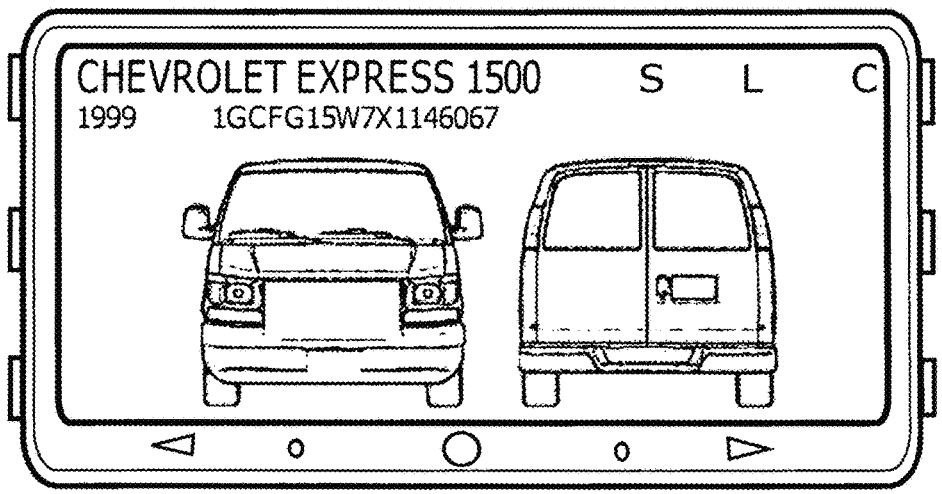
FIG. 14 Illustrates the pictures of the cited vehicle based on its model displayed on the police vehicle LCD unit.
Figure 15:
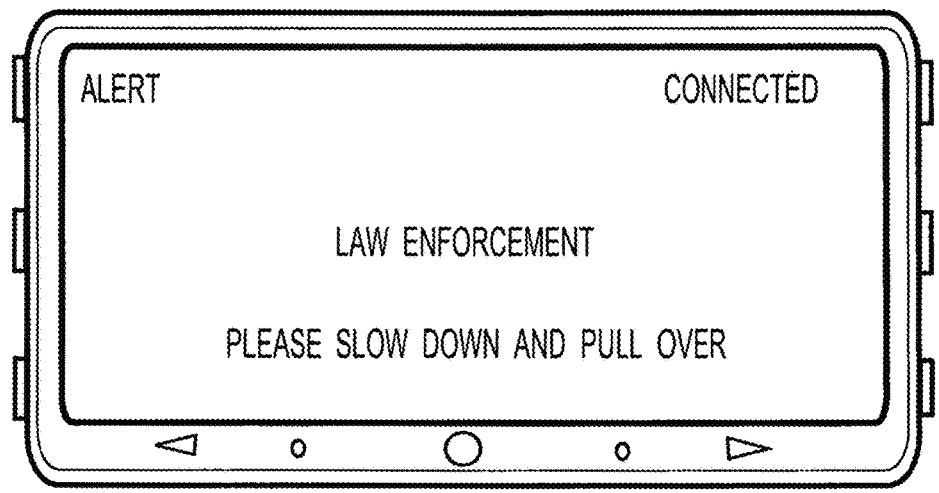
FIG. 15 Illustrates an example of a stop alert or a high-speed chase alert message displayed on the vehicle LCD unit.
Figure 16:
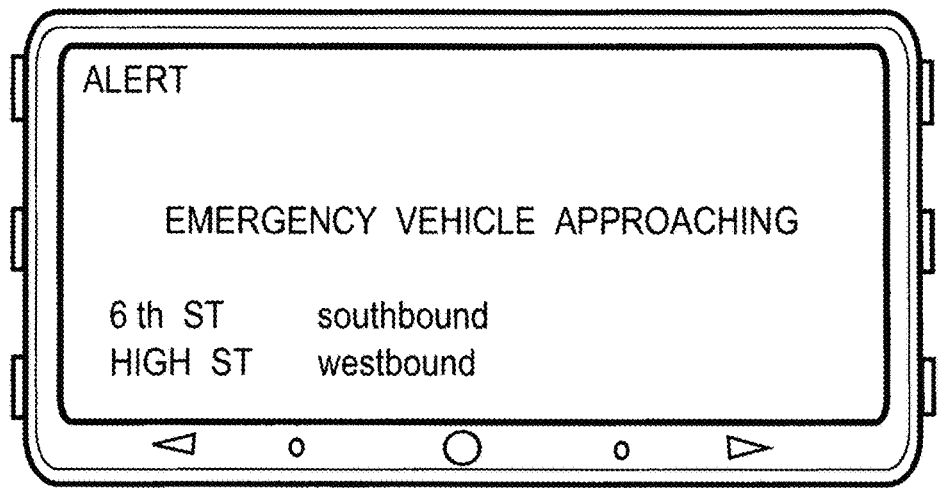
FIG. 16 Illustrates an example of an emergency vehicle alert message displayed on the vehicle LCD unit.

As shown in FIG. 3 and FIG. 4, the police vehicle unit P210 includes similar electronic components as the vehicle unit V10, and is programmed to communicate with the vehicle unit V10 via the long range (1-2 mile) and the short range (0.1-0.2 mile) radio frequency, also the police unit P210 can communicate with the vehicle unit V10 via the cellular network.

Furthermore, the memory 220 stores the "control operating system" which is responsible for all the control commands needed to manipulate the vehicle unit V10. The memory 220 stores the vehicle model, type and class application, and also stores the database of the GPS digital map application.

The unit P210 is installed inside the police vehicle in either a portable manner or in an installation manner similar to the unit V10.

The police LCD unit 240 as shown in FIG. 4, includes a touch screen LCD display 246 which can display colored pictures of a wide range of vehicles' models. The LCD display 246 is used to display the response messages transmitted by the vehicle unit V10, it is also used as an interface to activate the control commands. The LCD unit 240 also includes a microphone module 254, a speaker module 256, and a headset jack module 258 for audio communication with the vehicle unit V10, they are also used to activate the control commands via the voice recognition application.

Generally the LCD unit 240 includes application processor 248, the memory 242 to store the vehicle model, type and class application, it also stores the in-car traffic light cycle application which is a component of the in-car traffic light system, camera module 250 to keep at least ten minutes of recorded video of the roadway, LED indicators 260 to be used for in-car traffic light system and for alerting/warning indication, the buttons 270, a USB port 280, and a removable memory storage 282. The application processor 248 is responsible for interpreting and executing the control commands and sub-commands from the users interface. The USB 280 is used to update the digital map application, the vehicle model, type and class application, and the in-car traffic light cycle application. The USB 280 is also used to update the entire operating system and the control commands. The removable memory storage 282 is used for keeping a record of the police vehicle unit P210 activity for predetermined period of time. The LCD unit 240 is connected to the police vehicle unit 210 via a USB cable which is connecting the USB port 247 to the USB port 222. The USB port 222 supplies electric power across the cable to the LCD unit 240.

The LCD unit 40 as shown in FIG. 2, includes electronic components similar to the LCD unit 240, but its memory 42 stores the in-car traffic light cycle application and the video records for at least ten minutes of the roadway and the GPS readings for at least the last thirty minutes of the vehicle movement.

Its LCD display 46 is used to display alert/warning messages transmitted by the police unit P210. The LCD display 46 is also used to display the in-car traffic related messages and alert messages transmitted by the traffic logging unit 400. The application processor 48 is responsible for interpreting and executing most of the commands from the users interface. The USB port 80 is used to update the digital map application and the in-car traffic light cycle application. The removable memory storage 82 is used for having a copy of video record of at least the last ten minutes of the roadway, wherein five minutes of this record is after the vehicle fully stopped. Also the removable memory storage 82 is used to have a GPS records of at least the last thirty minutes of the vehicle movement. The video and GPS records will be used for the accident report file for legal or financial purposes. The vehicle unit V10 is designed to communicate with the police vehicle unit P210 even if the LCD unit 40 is being removed or disconnected and without affecting the functionality of the control command system. The Light Emitting Diodes indicators 60 include a green LED indicator 61, a yellow LED indicator 62, a red LED indicator 63, a green right arrow LED indicator 64, and a green left arrow LED indicator 65. When the vehicle unit V10 receives any alert message from (a police unit P210, or a traffic logging unit 400), the yellow LED indicator 62 will start flashing. Generally, the LED indicators 60 are used to illuminate the synchronized LED's in-car traffic light cycle.

Figure 27:
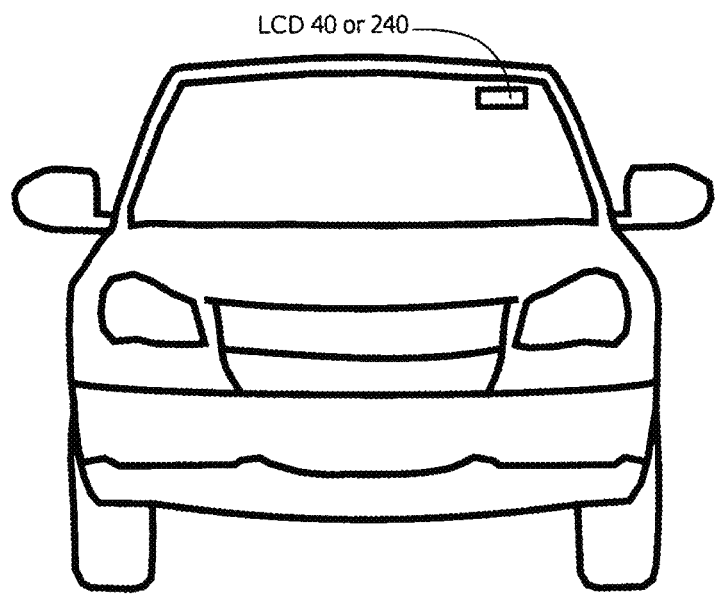
FIG. 27 Illustrates the location and the position of installation the police LCD unit or the vehicle LCD unit inside the car.
Figure 28:
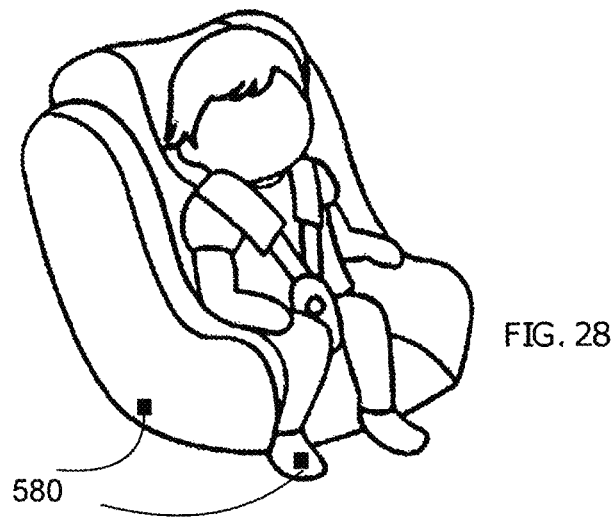
FIG. 28 Illustrates an example of RFID tags being attached to a baby car seat or attached to his shoe.

The LCD unit 40 is connected to the vehicle unit 10 via a USB cable which is connecting the USB port 47 to the USB port 22. The USB port 22 supplies electric power across the cable to the LCD unit 40. The LCD unit 40 and the police LCD unit 240 installed to face the driver by an appropriate manner without blocking the line-of-sight with the road or with the street traffic lights as shown in FIG. 27.

Model, Type and Class Category of Vehicles

In general a VIN code of a vehicle, is a unique code including a serial number, used by the automotive industry to identify individual motor vehicles, as defined in ISO 3833.

The vehicle descriptor section of the VIN code is used to identify the vehicle type, the model and the body style. While, vehicle identifier section of the VIN is used to identify the individual vehicle. The vehicle descriptor section of the VIN code will tell in which class category the vehicle belongs, therefore when the police vehicle unit P210 receives a VIN code transmitted by a unit V10, the unit P210 will know instantly the type, model and the class category (body style) of the vehicle. The police vehicle unit P210 is programmed to decode the VIN code to turn it into a vehicle class category and a model/type form to enable the police officer to a quick pick of a target vehicle from a category list displayed on the LCD display 246. For example, if the unit P210 received a VIN code from a "Toyota Avalon", the unit P210 will determine that the vehicle belongs to (FULL-SIZE CATEGORY), and if it receives a VIN code from a "Cadillac Escalade", the unit P210 will determine that the vehicle belongs to (FULL-SIZE SUV CATEGORY), . . . etc. Also the unit P210 is programmed with a directory of a wide-range of model/type pictures of vehicles to enable the police officer to view the rear/front side pictures of a vehicle who transmitted its VIN code. The function and the merits of the vehicle class category list and the model/type picture application will be clear while illustrating the high-speed pursuit system and others.

An Example List of the Vehicle Class Category

SUBCOMPACT: (examples: Ford Fiesta, Chevy Spark, Chevy Sonic, honda fit, Hyundai Accent, Kia Rio, Mazda2, Nissan Versa).

COMPACT: (examples: Subaru Impreza, Nissan Sentra, Toyota Corolla, Scion tC, Lexus IS, Honda Civic, Acura TSX).

MID-SIZE: (examples of midsize vehicles: Honda Accord (coupe)), Acura TL, Hyundai Sonata, Kia Optima, Mazda6, Infiniti G, Toyota Camry).

FULL-SIZE: (examples of full-size vehicles: Toyota Avalon, Lexus LS, BMW 7-Series, Mercedes-Benz (S-Class), Audi A8, Hyundai Genesis).

SPORT CAR: (example of sport vehicles: Dodge Challenger, Ford Mustang, Chevy Camaro, Honda CR-Z, Nissan Z, BMW M-Series, Audi TT).

CONVERTIBLE: (examples of convertible vehicles: BMW 6 Series, Chevrolet Camaro, Mercedes CLK, Volvo C70, Volkswagen Eos).

COMPACT CUV (MIM MPV): (examples: Jeep Compass, Chevy HHR, Honda Element, Acura RDX, Hyundai Tucson, Kia Sportage).

MID-SIZE CUV: (examples: Dodge Journey, Ford Edge, Lincoln MKX, Chevy Equinox, GMC Terrain, Cadillac SRX).

FULL-SIZE CUV: (examples: Dodge Durango, Lincoln MKT, Ford Flex, GMC Acadia, Mercedes-Benz (R-Class), Audi Q7).

OTHERS: (example: Lincoln Town Car limousine).

COMPACT SUV: (examples: Mazda Tribute, Nissan Xterra, Subaru Forester, Jeep Wrangler, Jeep Patriot, Jeep Liberty).

MID-SIZE SUV: (examples: Jeep Grand Cherokee, Ford Explorer, Honda Pilot, Acura MDX, Kia Borrego, Nissan Pathfinder).

FULL-SIZE SUV: (examples: Cadillac Escalade, GMC Yukon, Lincoln Navigator, Ford Expedition, Lexus LX).

MINI VAN: (examples: Chrysler Town and Country, Ford Galaxy, Peugeot 807, Renault Espace, SEAT Alhambra).

FULL-SIZE VAN: (examples: Ford E-Series, Chevy Express). CARGO VAN: (examples: Ford Transit Connect, Chevrolet Express 1500 Cargo, Ford E350 Van).

BUS: - - -

COMPACT PICKUP TRUCK: (examples: Chevrolet Montana, Fiat Strada, Volkswagen Saveiro, Ford Ranger).

MID-SIZE PICKUP TRUCK: (examples: Dodge Dakota, Chevy Colorado, GMC Canyon, Honda Ridgeline, Toyota Tacoma).

FULL-SIZE PICKUP TRUCK: (examples: Toyota Tundra, Nissan Titan, GMC Sierra, Chevy Avalanche, Chevy Silverado, Dodge Ram).

DUMP TRUCK: - - -

SEMI-TRAILER TRUCK: - - -

FULL-TRAILER TRUCK: - - -

Some of the control commands are listed and illustrated based on their purposes as following:

SPOT LOG command is used to log the VIN codes of vehicles near to make a complete stop into the spot logging unit 300 (surveillance data logger), the spot logging unit 300 will transmit the spot log command via the short range (0.1-0.2 mile) frequency after it receives a log request from a vehicle.

TRAFFIC LOG command is used to log the VIN codes of vehicles into the traffic logging unit 400 (surveillance data logger), the traffic logging unit 400 will transmit the traffic log command via the short range (0.1-0.2 mile) frequency.

CLONE command is used to allow the vehicle unit V10 to periodically re-transmit any specific command "target command" transmitted by the police unit P210 via the long range frequency. Generally, the target command could be (VIN report command) or (RFID tag report command). The clone command is used to widely increase the number of vehicles that will do the scan search of a particular vehicle or a particular RFID tag, cloning is a process to multiply the number of vehicles that mimic police vehicles in performing a search process.

CONNECT command is used to connect the target vehicle to the cellular network, the police unit P210 will transmit this command combined with the cell-phone codes (SIM card codes) and a local dispatch center phone number.

The target vehicle will periodically send its location data. Also the police officer or the local dispatch center can call the target vehicle or send control commands to it. The local dispatch center will continue track down the movement of the target vehicle and communicate with the police vehicles in the vicinity of the target vehicle.

The cellphone codes will be transmitted from the police unit P210 to the vehicle unit V10 to give it a temporary ability to connect to the cellular network. Each one of the police vehicles will be assigned a number of sets of "Cell-phone Codes" to enable the police vehicle unit P210 to lend the vehicle unit V10 the necessary codes that are required for cellular communication. In this scenario the SIM card operating system that required to connect the vehicle unit V10 to the cellular network must be manipulated and redesigned to allow the SIM card codes to be inputted remotely by the P210 unit.

VIN report command is used to allow the target vehicle to connect to the cellular network and send (location report), which is used for vehicle search process. The police unit P210 will transmit the VIN report command combined with the cell-phone codes and the local dispatch center's phone number. The location report contains the VIN code of the vehicle and real-time location of it.

Security and Crime-Fighting Involving Getaway Vehicles System

Unlawful or forcible entry or attempted entry of a residence. This crime usually, but not always, involves theft. The illegal entry may be by force, such as breaking a window or slashing a screen, or may be without force by entering through an unlocked door or an open window. As long as the person entering has no legal right to be present in the structure a burglary has occurred. Furthermore, the structure need not be the house itself for a burglary to take place; illegal entry of a garage, shed, or any other structure on the premises also constitutes household burglary. If breaking and entering occurs in a hotel or vacation residence, it is still classified as a burglary for the household whose member or members were staying there at the time the entry occurred.

A motor vehicle, commonly referred to as a getaway car, is frequently used by the offender to flee the scene of a crime. Getaway cars are prevalent in major crimes such as bank robberies and homicides. Very frequently, but not always, a getaway car is stolen and is abandoned soon after the crime, in the hope that the vehicle cannot be traced to the offender.

If the vehicle does not belong to the driver and is quickly abandoned, a trace may not be possible without examination of forensic evidence. In some cases, the offender may go to extreme measures to discard the getaway vehicle in order to hide his tracks by dumping it in a river or secluded park, and/or setting it on fire; while this may not make solving the crime impossible, it can make the effort more difficult for law enforcement. The criminal investigation can be further complicated by the use of multiple getaway vehicles, which can confuse eyewitnesses, as well as creating multiple places to investigate: each vehicle is a new crime scene.

Since a getaway vehicle often requires a getaway driver, this additional co-defendant creates problems in itself. First, having a second perpetrator involved creates yet another inchoate offense that the prosecutor can use in an indictment conspiracy. If the driver, who may have parked some distance away, unknowingly drives past the scene of the crime, the getaway vehicle itself may identify the occupants to the crime victim and police. This is especially true if the vehicle has unique markings or is an unusual model. Without a driver, the perpetrator may make errors due to the stress associated with the crime, or lack of ability to multi-task (such as leaving the car keys at the scene of the crime); a murderer needs to "think strategically" to get away with murder—to "mislead police, stage crime scenes and destroy evidence." Taking a public bus or taxicab makes the driver an involuntary co-conspirator, yet also creates an eyewitness whose interest it is to cooperate with police.

Witnesses to the crime will often attempt to take note of the tags (registration plate) or other important details of the car and report this information to law enforcement. It may be possible to identify the offender if an officer spots the offender in possession of the vehicle prior to its abandonment. Thus, the present security and crime-fighting system creates a method to help law enforcement identify the offenders in a quick and efficient manner, by identifying the suspect vehicles that may be used by the offenders. Therefore, logging vehicles that come to stop nearby a spot logging unit 300 and storing the logged data in real-time status can provide the law enforcement an instant access to the logged information from the crime scene logging unit 300 in a manner similar to surveillance cameras systems. Surveillance cameras are video cameras used for the purpose of observing an area, the cameras are often connected to a recording device or IP network, and may be watched by a security guard or law enforcement officer. The logged information of the present spot logging unit generally include the VIN code of vehicles stopped in the range of the spot logging unit and also include the exact date/time and the vehicles' latitude/longitude.

Additionally, when installing the spot logging units in certain locations such as warehouses or highly secured areas, the spot logging units can trigger security alarms when they log vehicles not permitted to be in these locations when their VIN codes not matching the VIN codes of the permitted vehicles which have their VIN codes stored in the spot logging units.

Prior systems generally rely on continuously logging the vehicles' locations in a central database, these database systems are similar to the database systems used by cellphone carriers. And when there is a need to obtain data relevant to a particular location (crime scene), the law enforcement follows the legal protocol to obtain these vital records from the database carrier. The serious weakness of these systems is wasting the crucial time just after the crime. A plenty of valuable time will be lost during the process of obtaining the logged records from the database carrier. Therefore, the offenders will have a good chance to abandon the getaway vehicle and may get rid of some important evidence. Also prior systems may violate the privacy rights of the vehicles' owners by having their movement continually monitored and stored in a central database for a long period of time. Thus, the present security and crime-fighting system relies on individually owned spot logging units 300 to be used for security and protection reasons (similar to the video cameras' purpose), to provide an immediate access to the stored data. These individually owned spot logging units 300 can be installed in homes, public parks, banks, schools, and commercial properties such as malls, gas stations, grocery stores, warehouses and parking lots, . . . etc.

Figure 19:
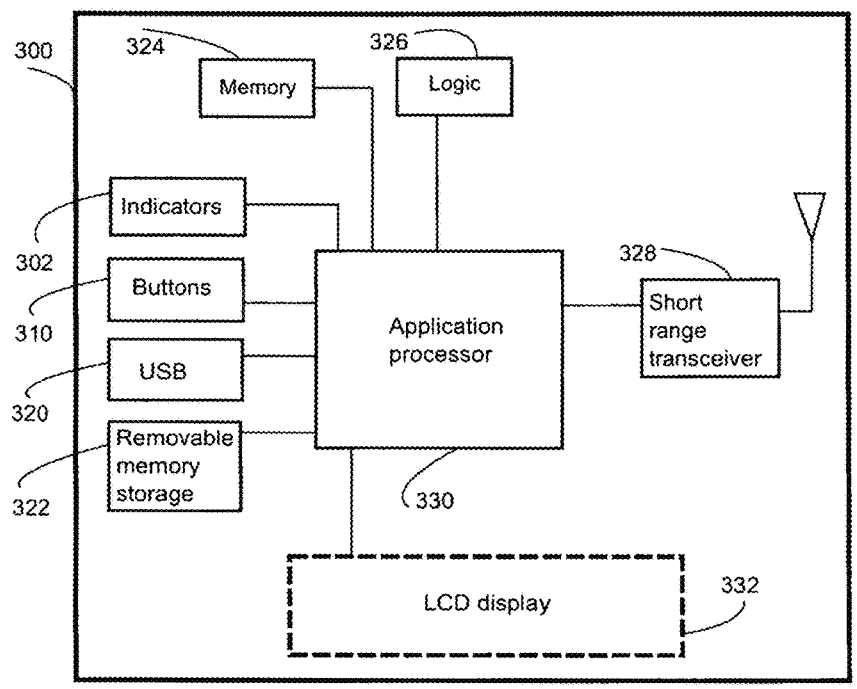
FIG. 19 Is a block diagram of the spot logging unit (surveillance data logger) 300.
Figure 29:
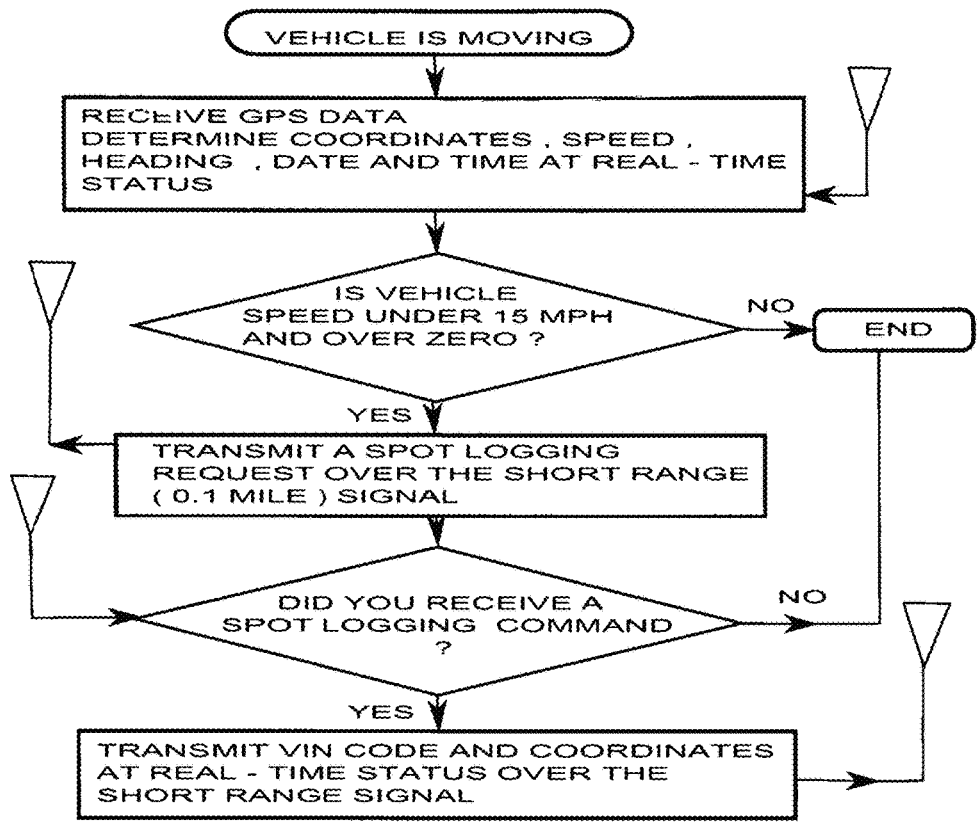
FIG. 29 Illustrates a flow chart example of a spot logging (surveillance data logger) process done by the vehicle unit.
Figure 30:
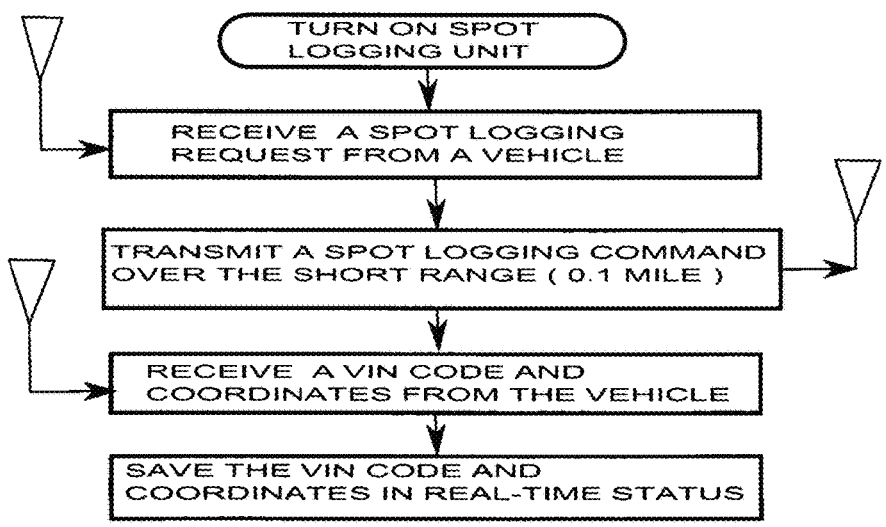
FIG. 30 Illustrates a flow chart example of a spot logging (surveillance data logger) process done by the spot logging unit.
Figure 31:
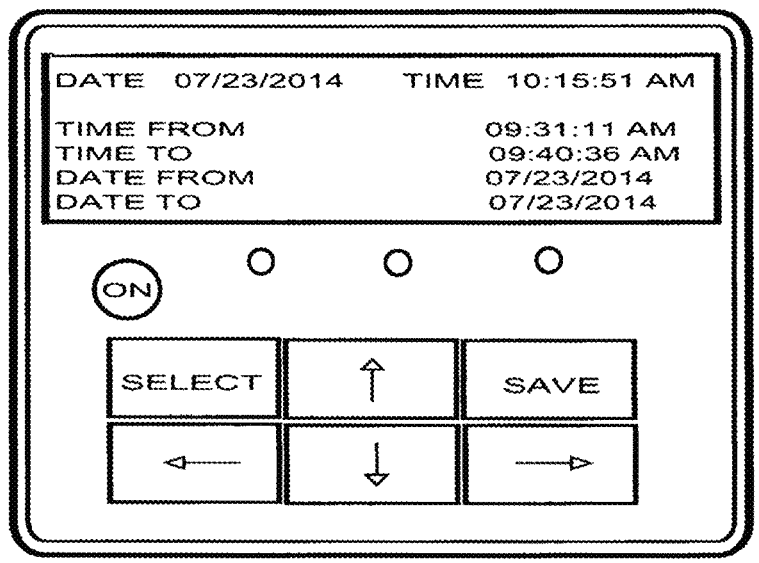
FIG. 31 Illustrates an example of the spot or traffic logging unit " surveillance data logger " (front view).

As illustrated in the block diagram of FIG. 19, the spot logging unit 300 includes a short range (0.1-0.2 mile) transceiver module 328, a microprocessor 330, a memory 324, indicators 302, buttons 310, USB port 320, removable memory storage 322 and LCD display 332. This unit uses the short range radio frequency transceiver module 328 to communicate with the vehicle unit V10. And comprises a memory 324 to store the data transmitted by the vehicle unit V10. Generally, vehicles drop their speed when they come to stop, therefore the vehicle unit V10 is configured to transmit a logging request signal when its speed goes under 15 MPH as a threshold value via the short range signal to alert any spot logging unit 300 could be covered by its short range signal, as illustrated in the flow chart of FIG. 29. And if there is any spot logging unit in the range of the transmitted request signal, the spot logging unit 300 is configured to respond and send a spot log command to the vehicle, as illustrated in the flow chart of FIG. 30. The vehicle unit V10 will reply by periodically transmitting its VIN code combined with its location at real-time status, until the vehicle's speed goes to zero, then it will stop transmitting. And when the vehicle's speed goes above zero, the vehicle unit V10 will periodically transmitting its VIN code combined with location at real-time status. The vehicle unit V10 will stop transmitting after the speed goes above 15 MPH. By obtaining the start time and the end time of logging, the spot logging unit 300 can determine the period of time in which the vehicle was at the scene. The memory 324 of the spot logging unit 300 could store the logged data for a long period of time. The indicators 302 include one indicator to show the unit 300 is turned on or off, another indicator flashes when the unit 300 is logging a vehicle and another indicator to show when the memory 324 is full. The buttons 310 include one button to turn on/off the unit 300, a number of buttons used as an interface to select a target vehicle or vehicles from a selected period of time in a certain date from the unit 300 and save the results to the removable memory storage 322, FIG. 31, shows an example of the spot logging unit 300. The LCD display 332 shows the logging data of the vehicles, these data include the make model/type and the VIN code of each vehicle combined with real date and time of logging. In a preferred embodiment of the unit 300, the LCD display 332 is a touch screen display and is used as an interface to deal with the logged data. The USB port 320 is used to upload the stored data and to update the operating application of the unit 300.

When law enforcement officers or the owners of the spot logging units realize that a crime has been committed at specific date/time, the law enforcement officers obtain the VIN codes of the suspected vehicles from the sport logging units and starting the search for the vehicles, the police vehicle unit 210 is configured to transmit VIN report command to allow the target vehicle to connect to the cellular network and send location report. The police unit P210 will transmit the VIN report command combined with the connect command and the clone command. The location report contains the VIN code of the target vehicle and real-time location of it, the clone command to allow the vehicle unit V10 of other vehicles to periodically re-transmit the VIN report command and the connect command. The clone command is used to widely increase the number of vehicles that will do the scan search of a particular vehicle, cloning is a process to multiply the number of vehicles that mimic police vehicles in performing a search process to cover a very wide area in a short time period.

Collecting Traffic Data for Intersection Design

Figure 17:
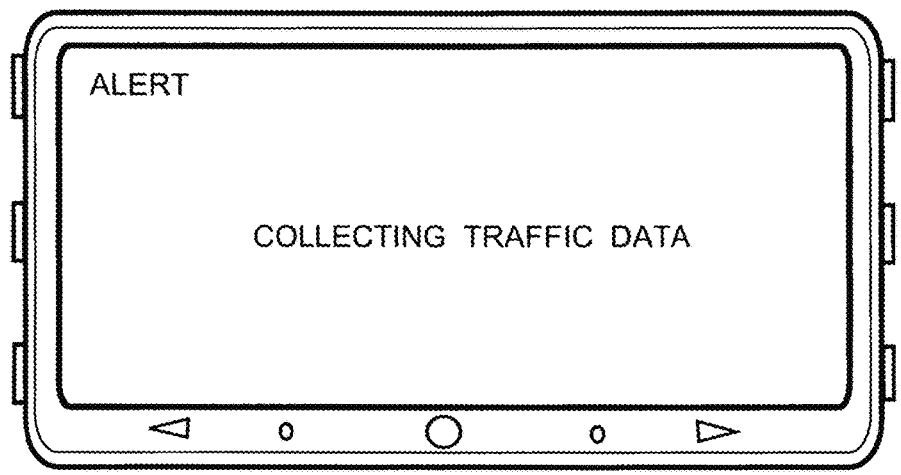
FIG. 17 Illustrates an example of a collecting traffic alert message displayed on the vehicle LCD unit.
Figure 18:
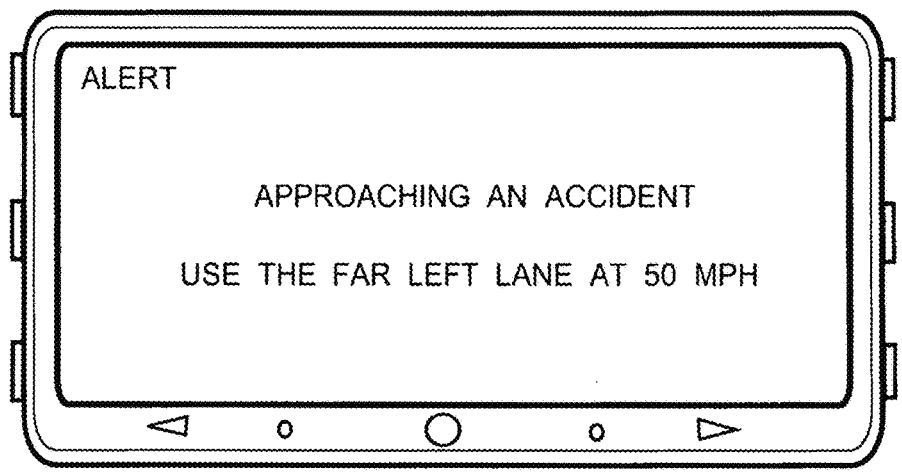
FIG. 18 Illustrates an example of a roadway safety alert message displayed on the vehicle LCD unit.
Figure 20:
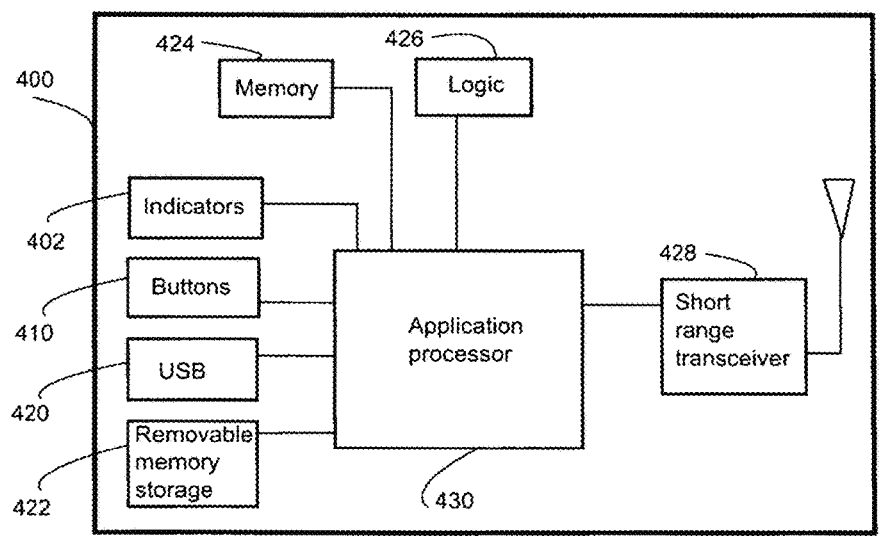
FIG. 20 Is a block diagram of the traffic logging unit (surveillance data logger) 400.
Figure 21:
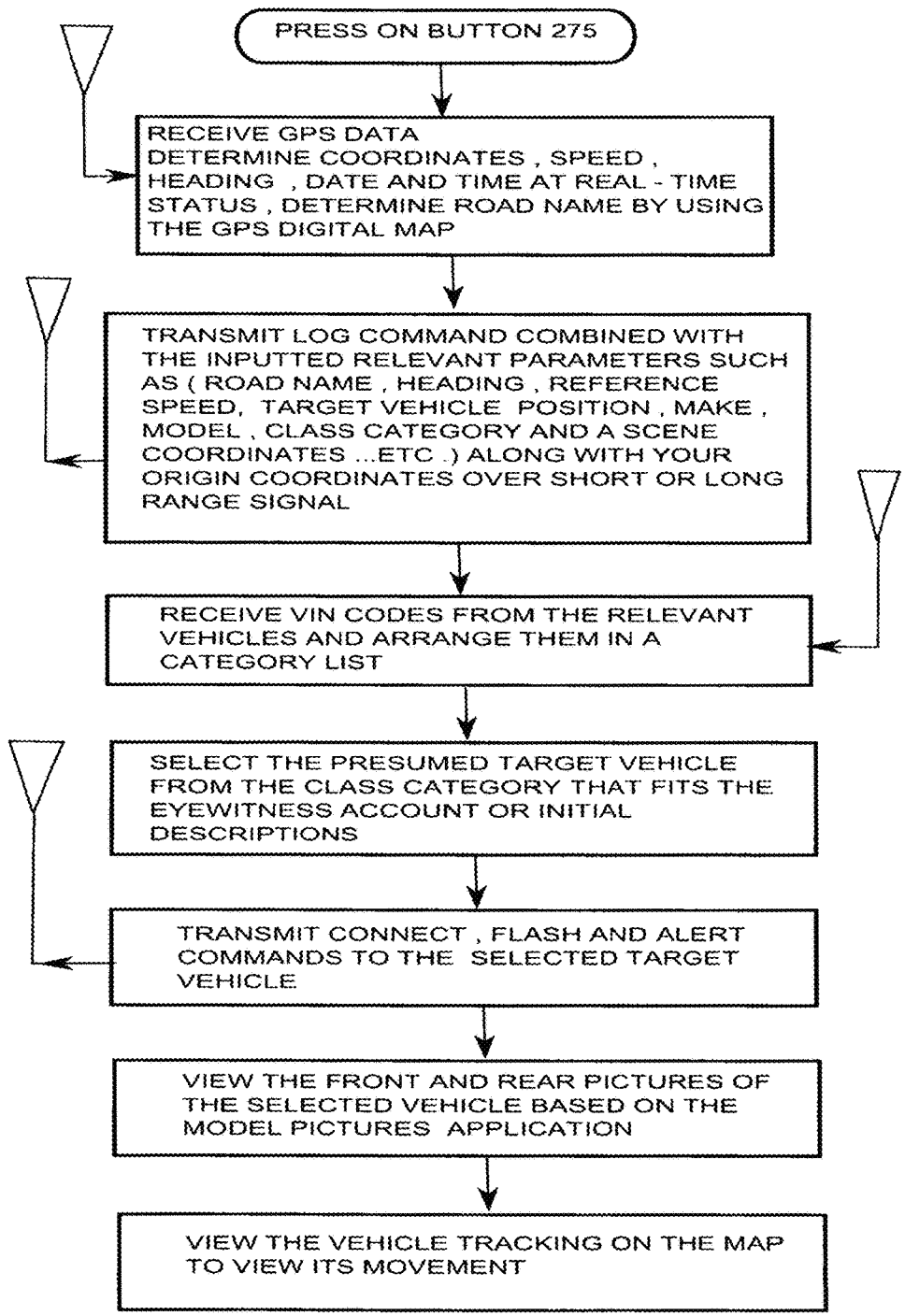
FIG. 21 Illustrates an example flow chart of a high-speed chase process.
Figure 22:
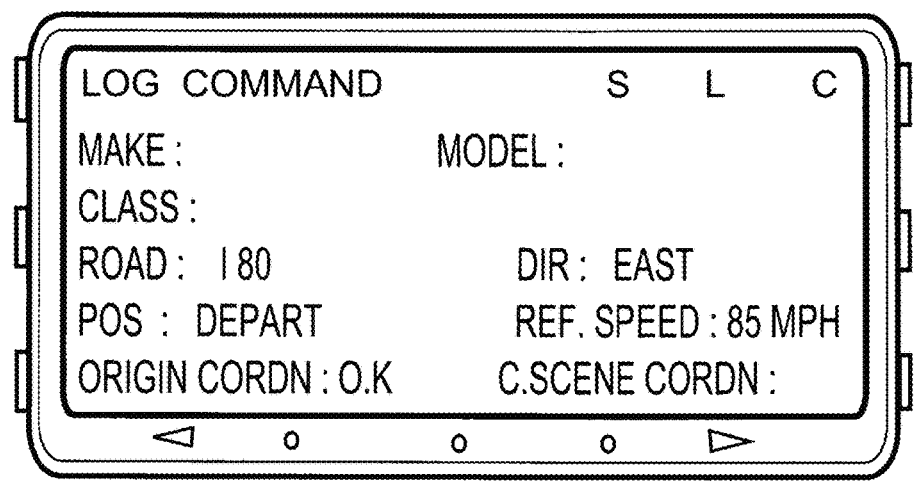
FIG. 22 Illustrates an example of a high-speed chase process, it shows the inputted parameters by the police to apply a log command.
Figure 23:
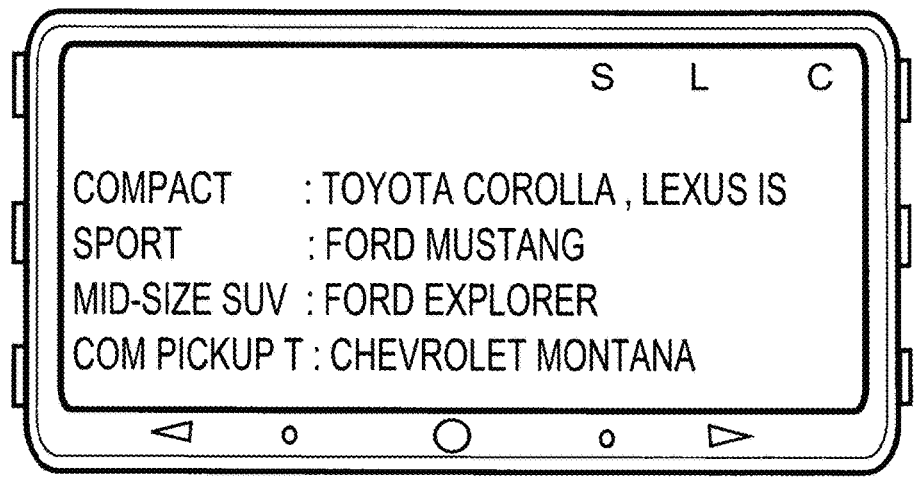
FIG. 23 Illustrates a class category list of the responding vehicles.
Figure 24:
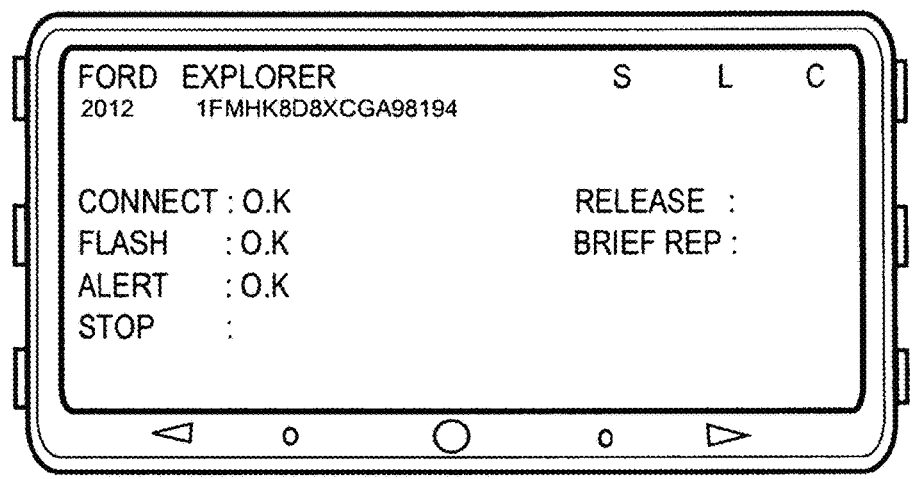
FIG. 24 Illustrates inputting (connect, flash and alert) commands to transmit them to the target vehicle.
Figure 25:
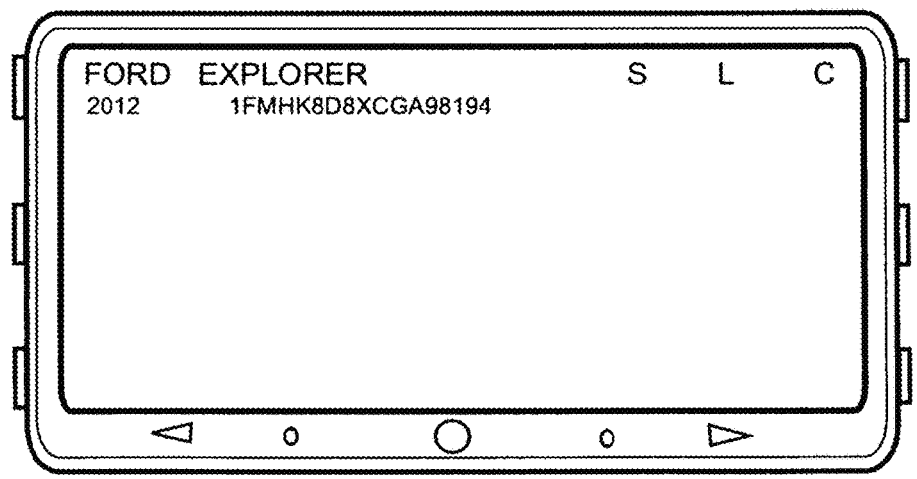
FIG. 25 Illustrates the rear and front pictures of the target vehicle based on its model.
Figure 32:
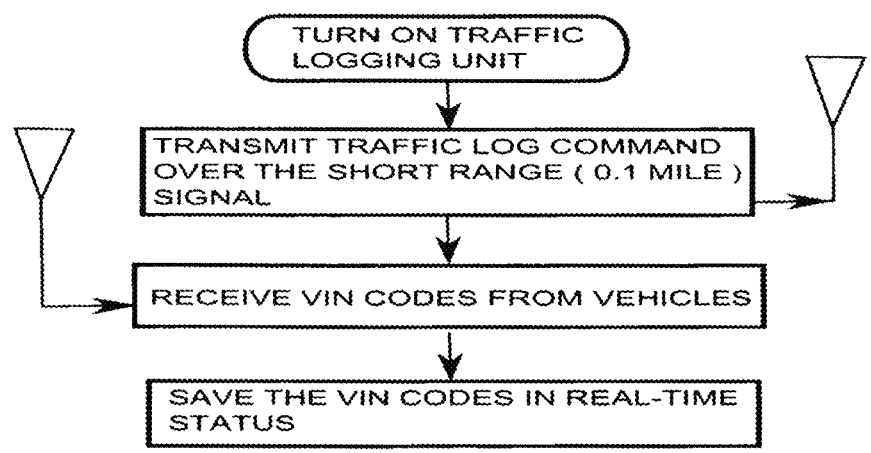
FIG. 32 Illustrates a flow chart example of a traffic logging (surveillance data logger) process done by the traffic logging unit.

As illustrated in the block diagram of FIG. 20, the traffic logging unit 400 is a portable or fixed unit and includes similar circuit components as the spot logging unit 300. The unit 400 includes a short range (0.1-0.2 mile) transceiver module 428, a microprocessor 430, a memory 424, indicators 402, buttons 410, USB port 420, and removable memory storage 422. The traffic logging unit 400 is configured to collect the traffic data needed for the intersection design. By assigning a traffic logging unit 400 for each one of the intersection legs, the traffic logging unit 400 will periodically send a TRAFFIC LOG command via the short range (0.1-0.2 mile) frequency as shown in the flow chart of FIG. 32, all vehicles traveling on each leg will transmit their VIN codes. And by collecting the stored data from each one of the traffic logging unit 400, we can determine the volume of traffic and the size of the vehicles that crossing and turning at an intersection, by simply decoding the VIN codes into vehicle model/type and body style form. When the traffic logging unit 400 sends the traffic log command, the yellow LED indicator 62 (one of the LCD unit 40 LED indicators 60) will start flashing and a (collecting traffic data) alert message will appear on the vehicle unit LCD display 46 as shown in FIG. 17.

Additionally, by instantly uploading the data collected by traffic logging units installed at specific locations or intersections via wire/wireless networks to a central sever, we create a vehicle monitoring system for security and safety purposes.

Certain additional advantages and features of this invention may be apparent to those skilled in the art upon studying the disclosure, or may be experienced by persons employing the novel system and method of the present invention.

While the invention has been described with a limited number of embodiments, it will be appreciated that changes may be made without departing from the scope of the original claimed invention, and it is intended that all matter contained in the foregoing specification and drawings be taken as illustrative and not in an exclusive sense.

The invention claimed is:

1. A system for locations surveillance by remotely logging surveillance data transmitted by a vehicle when the vehicle's speed is under a threshold value while coming to a halt in close proximity to a surveillance data logger; the system comprising: a first in-vehicle apparatus on-board civilian vehicles; a second in-vehicle apparatus on-board law enforcement vehicles; the surveillance data logger installed at a location; wherein the surveillance data logger is configured to wirelessly communicate with the first in-vehicle apparatus to receive data associated with the vehicle; wherein the first in-vehicle apparatus on-board the civilian vehicle comprising:
  a) wireless communication means to communicate with, the surveillance data logger, law enforcement vehicles and local dispatch centers, and comprising, a cellular network communication module, a long and a short range transceiver module;
  b) at least one memory comprising computer program code for one or more programs, the memory further comprises the VIN code of the vehicle;
  c) at least one GPS receiver module to enable the vehicle to determine its position coordinates, speed, course and date/time at real-time status; and,
  d) at least one processor being coupled to said wireless communication means, and said memory;
wherein the first in-vehicle apparatus transmits a logging request signal via the short range transceiver when the vehicle's speed is under the threshold value to alert the surveillance data logger, wherein the surveillance data logger replies by transmitting a spot logging command to request the vehicle's VIN code, and the vehicle's position coordinates/course at real-time status until the vehicle's speed is zero, wherein the first in-vehicle apparatus resumes transmitting the vehicle's VIN code, and the vehicle's position coordinates/course at real-time status until the vehicle's speed is above the threshold value.

2. The system of claim 1, wherein the surveillance data logger is used for locations surveillance and locations security, and comprising:
  a) wireless communication means to communicate with the vehicle coming to a halt in close proximity to the surveillance data logger, wherein the communication means comprising a short range transceiver module;
  b) at least one memory comprising computer program code, the memory further comprises: stored data associated with the vehicle's VIN code, and the vehicle's position coordinates/course at real-time status; a database comprising: a plurality of make/model and body style category list of vehicles, and a set of vehicle's photos associated with each make/model;
  c) a processor being coupled to said wireless communication means, and said memory; and,
  d) a visual display to display stored data associated with a suspect vehicle and to display stored data associated with specific date/time;
wherein the stored data are used for tracking down a suspect vehicle involved in a crime in the vicinity of a location contains the surveillance data logger.

3. The system of claim 2, wherein the surveillance data logger is further configured to communicate with traveling vehicles for collecting data required in intersections design; wherein the surveillance data logger is installed at each leg of an intersection; wherein the surveillance data logger transmits a traffic log command to be received by vehicles traveling in close proximity to the surveillance data logger, wherein the vehicles reply by transmitting their VIN codes, wherein combining the collected data of an entire intersection determines the volume of traffic and the sizes of the vehicles for both straight and turning movement at the intersection.

4. The system of claim 3, wherein instantly uploading the collected data to a central server to be used in security and surveillance purposes.

5. The system of claim 1, wherein the second in-vehicle apparatus on-board the law enforcement vehicle comprising:
  a) wireless communication means to communicate with a target vehicle that is logged in the surveillance data logger, a local dispatch center and law enforcement vehicles, and comprising, a cellular network communication module, a long and a short range transceiver module;
  b) at least one memory comprising computer program code for one or more programs, the memory further comprises: a plurality of control commands to remotely manipulate the target vehicle; a plurality of cellular network communication codes are required to remotely connect the target vehicle to the wireless cellular network;
  c) a database comprising: a plurality of make/model and body style category list of vehicles, and a set of vehicle's photos associated with each make/model, wherein each body style category comprises vehicles that have similar body style;
  d) at least one GPS receiver module to enable the law enforcement vehicle to determine its position coordinates, speed, course and date/time at real-time status; and,
  e) at least one processor being coupled to said wireless communication means, said memory and said database;
wherein the second in-vehicle apparatus transmits the target vehicle's VIN code combined with the connect and clone commands to force the target vehicle to transmit its real time location to be received by the local dispatch center.

6. The system of claim 1, wherein the surveillance data logger is configured to trigger a security alarm coupled to it when un-permitted vehicles log their VIN codes in the surveillance data logger.

* * * * *